United States Patent

[11] 3,544,726

[72] Inventors Berry J. Wimberly
Falls Church, Virginia 40047

[21] Appl. No. 708,390
[22] Filed Feb. 26, 1968
[45] Patented Dec. 1, 1970

[73] Assignee American Telephone and Telegraph Company, New York, N.Y., a corporation of New York

[54] CONFERENCE SWITCHING SYSTEM
21 Claims, 24 Drawing Figs.

[52] U.S. Cl. .................................................. 179/18
[51] Int. Cl. .................................................. H04m 3/42
[50] Field of Search .......................................... 179/18.01, 27.02, 1(Inquired)

[56] References Cited

UNITED STATES PATENTS

| | | | |
|---|---|---|---|
| 3,170,042 | 2/1965 | Giroud et al. ................. | 179/18 |
| 3,210,476 | 10/1965 | Shaer ........................... | 179/18 |

FOREIGN PATENTS

| | | | |
|---|---|---|---|
| 1,074,665 | 4/1960 | Germany ...................... | 179/18 |

*Primary Examiner*—Kathleen H. Claffy
*Assistant Examiner*—David L. Stewart
*Attorneys*—N. S. Ewing and James Warren Falk

ABSTRACT: A communication switching system is arranged to conference a group of line circuits and one trunk circuit via a common bus. Additional trunks may be added to the conference by connecting one terminal of a bridge circuit to the common bus while connecting a second terminal of the bridge to another bus associated with the common bus. The connection of the bridge circuit with the common bus automatically transfers the previously connected trunk circuit to the other bus, thereby interposing the bridge circuit into the conference connection between the trunk and the common bus. Echo suppression circuitry, individual to each terminal of the bridge circuit, is inhibited upon the connection of a trunk circuit which does not require external echo suppression.

INVENTOR
B. J. WIMBERLY
BY [signature]
ATTORNEY

PATENTED DEC 1 1970

3,544,726

SHEET 20 OF 24

CONFERENCE SWITCHING SYSTEM

BACKGROUND OF THE INVENTION

This invention pertains generally to a communication switching system and more specifically to a system for the establishment of several independent conference connections among large numbers of line circuits and trunk circuits.

With the development of portable communication devices, a new dimension, mobility, has become of increasing significance in the design of communication switching systems. Lightweight handheld station instruments have all but replaced the bulky rigidly affixed devices in common usage less than a generation ago. In conjunction with the mobility of these communication instruments, there is an ever increasing demand for additional features which render portable communication services more convenient and flexible.

For example, during periods of organized emergency action, as is necessary for flood control or civil defense purposes, it is essential that central coordinators maintain communication links with stations in remote locations. In order more efficiently to synchronize the various activities, it is frequently desirable for many of these remote stations to communicate with each other in conference fashion as well as with the coordinator. In addition, it may be necessary to include in the conference link stations located many miles distant. This long distance connection may be accomplished by a direct line to the distant station or via a central office trunk circuit and the regular commercial switching system or even by a mobile radio hookup.

A specific example of the desirability of a flexible conference system is in the control of a major flood. At such a time, activities at many locations must be carefully synchronized in response to rapidly fluctuating conditions. In this situation it is necessary that those in charge of the action, both in the field and at a headquarters location, continually be apprised of the course of events so as to have the opportunity to quickly issue new coordinated instructions. It is therefore necessary that independent conference communication links be established between any group of stations, each with the capability of easily moving from location to location as the situation dictates, and any group of trunk circuits, long distance line circuits, or mobile radio circuits.

In the past, in order to accomplish these objectives, it has been necessary to terminate each mobile station at a central office and to establish the conference connections through the regular central office switching network. Since, under this arrangement, each station must be dialed individually, establishment of conference connection is awkward as well as extremely time consuming. In addition, the termination of the station lines at a central office has a serious drawback from a mobility standpoint, namely, the necessity to connect expensive line circuits to the central office from each remote location. Under such conditions, the convenience and flexibility desired of the mobile communication system is minimized.

To obviate the foregoing problems, while providing flexible conference connection links, it is necessary that the line circuits extending to the stations be interconnectable with each other, as well as with the long distance circuits, without resort to the central office switching network. In the prior art, conference arrangements of this nature have been provided typically by arranging a crossbar switch field to form a common bus such that the transmit pairs of all selected lines could be interconnected separately from the interconnection of all the receive pairs. In these systems, signals transmitted from any station over the transmit bus are returned via the receive bus to all the connected lines. In addition, signals, which appear as side-tone, also are returned to the transmitting station.

The above-referred to conference arrangements have the well-known limitation that since side-tone to the stations is provided by the common bus, all connected stations must be within the allowable distance limitation for side-tone delay. This restriction is, of course necessary because the return of an excessively delayed signal (echo) to the transmitting station seriously interferes with the thought speech processes of a speaker. Central office trunk circuits may exceed the allowable distance limit for side-tone delay because they have the inherent capability of being utilized in conjunction with long distance switching networks. Therefore, it is necessary that echo suppression circuitry be provided on all such trunk-conference connections. Similarly, each of the long distance line circuits which exceeds the side-tone distance limitation also must have echo suppression provided for conference purposes.

Therefore, a situation prevails where, in order for a conference of long distance circuits (whether lines, mobile radio or trunks) and short distance lines to be established, it is first necessary to terminate each long distance circuit on a separate leg of a conference bridge circuit. Echo suppression circuitry, which is necessary to meet the transmission requirements, may then be provided, on an individual basis, on each leg of the conference bridge.

Presently known long distance conferencing systems, while providing for the termination of selected trunk circuits to individual legs of a conference bridge, do so in such a manner that only a single conference can be established at a time without resort to an elaborate central office type switching network. The prior art systems which provide for the establishment of more than one conference of long distance trunk circuits do so in such a manner that communication between the trunks is possible in only one direction. A typical example of such a system is disclosed in U.S. Pat. No. 3,301,962, dated Jan. 31, 1967, of W. J. McKelvey et al. which, although a substantial contribution to prior art conferencing arrangements, highlights the deficiency of the existing art in the area of two-way conferencing systems. The McKelvey disclosure teaches a conference system selectively controlled so as to connect a plurality of lines to a directional conference link. In McKelvey, a selected one of the lines is enabled to direct communications to all other lines while restricting the other lines to communicate with only the one line.

Because of the unidirectional nature of such conferencing systems, conference bridge circuits which enable two-way transmission, are unnecessary. The prior art, therefore, does not provide for an arrangement wherein bridge circuits, each common to a selected group of trunk circuits, can be serially inserted between each such circuit and a selectable conference of line circuits. Thus, no provision has been made for situations where multiple independent transmission connections are necessary between selected groups of long distance circuits and selected groups of line circuit.

In view of the foregoing, an object of this invention is to provide a conference network which is of simple and economical construction.

A further object is to provide a conference network in which selected groups of lines can be conferenced with selected groups of trunks.

A still further object is to provide a switching array for the insertion of one port of a conference bridge or connecting circuit into a connection between any trunk any any established conference.

A still further object is to provide a conference network with echo suppression for all long distance circuits connected into the network in such a fashion as to automatically inhibit the echo suppressor upon association with a circuit not requiring the provision of external echo suppression.

SUMMARY OF THE INVENTION

These and other objects are obtained in accordance with an exemplary embodiment of the invention wherein trunk circuits (or other long distance communication circuits) terminate on the verticals of one crossbar switch field and short distance lines terminate on the verticals of another crossbar switch field. Each horizontal (link) of the short distance line switch field is connected to the corresponding horizontal of the long distance switch field through link amplifiers in such a manner that communication between corresponding switch field levels is possible. An operator console is also provided and arranged with pushbutton keys to control the establishment of trunk and line conferences.

Each link of the line switch field is arranged with talk-back amplifiers to form a common bus conference connection as previously described. The echo problem encountered on long distance conferences, as hereintofore discussed, is overcome by an arrangement of the long distance switch field whereby a conference bridge (containing echo suppressors) or any other type of auxiliary circuit can be serially inserted between selected long distance circuits and a selected link. A conference among these communication circuits is established by connecting each circuit to a port of the conference bridge or auxiliary circuit while also connecting one port of the bridge through the long distance switch field to the link talk-back amplifier. Thus communication between any long distance conference and any line conference is possible via the common link amplifier.

At the attendant console, lamps associated with each trunk (or other long distance circuit) and with each line, are provided to alert the attendant to a service request. The attendant console is further provided with keys which enable the attendant to select any horizontal level (link) of either switch field. Operation of any link key and one or more line keys activates a controller circuit so as to cause the closure of the corresponding crosspoints in the line swtch field. The selected lines are thereby connected together in a common bus conference arrangement on the selected link. Similarly, operation of any trunk key enables the closure of the corresponding crosspoints in the long distance (trunk) switch field, thereby connecting the selected trunk (or long distance line) into the conference connection through the link connection amplifier.

Additional keys on the attendant's console are provided to select any one of a number of conference bridge circuits whenever a conference of trunk circuits is to be established. Operation of any bridge select key in conjunction with any link select key activates the controller circuit so as to associate the selected bridge circuit with the selected link. Connection of a bridge circuit with a link enables equipment in any trunk currently associated with that link to inhibit the direct connection of that trunk and the link and to thereupon terminate the trunk instead, via a second appearance of the trunk, at a terminal of the connected bridge circuit through an auxiliary link. Operation of any additional trunk key on the console activates the controller circuit so as to enable the termination of the selected trunk circuit at another terminal of the conference bridge associated with the selected link. Communication is thereby effective to and from each trunk, through the common bridge circuit, to the selected link and via the link connection amplifier to the corresponding conference on the line switch field.

Each leg of the conference bridge provides echo suppression for any trunk connected to that leg. The system is arranged such that a signal passing through the connecting link from a connected trunk automatically inhibits the echo suppression feature in any leg upon the association of that leg with a trunk which does not require the external provision of echo suppression.

Electrical control of an established conference is maintained by the controller circuit thus allowing the establishment of independent conference connections in each of the horizontals (links) of the crossbar switch field.

In accordance with one feature of my invention, a switch array is provided which is selectively controllable so as to establish conference connections among a plurality of lines and a plurality of trunks thereby enabling echo free transmission among the connected stations. In accordance with another feature of my invention, a crossbar switch field, arranged for the termination of communication circuits and auxiliary circuits on respective verticals, is selectively controllable so as to enable the serial insertion of any one of the auxiliary circuits between selected communication circuits and any horizontal link.

In accordance with another feature of my invention, a conference switching network for establishing several independent conference connections among large numbers of line circuits and trunk circuits is arranged for the serial insertion of a conference bridge between each of the selected trunks and a common bus conference of line circuits.

In accordance with another feature of the invention, a conference switching network providing individual connections for trunk circuits to a conference bridge, each leg of which contains echo suppression circuitry, is arranged such that a signal passing through the conference switching network from a connected trunk automatically inhibits the echo suppression in any leg upon the association of that leg with a trunk which does not require the external provision of echo suppression.

DESCRIPTION OF THE DRAWING

The foregoing objects and features of my invention, as well as others, will be more apparent from a consideration of the subsequent description and the drawing, in which.

It will be noted that FIGS. 7 through 24 employ a type of notation referred to as "detached contact" in which an X shown intersecting a conductor represents a normally open contact of a relay and bar shown intersecting a conductor at right angles represents a normally closed contact of a relay; "-normally" refers to the unoperated condition of a relay. The principles of this type of notation are described in an article entitled "An Improved Detached Contact Type Schematic Circuit Drawing" by F. T. Meyer in the Sept. 1955 publication of the American Institute of Electrical Engineers Transactions, Communications and Electronics, Vol. 74, pages 505-—513.

Figure 7:
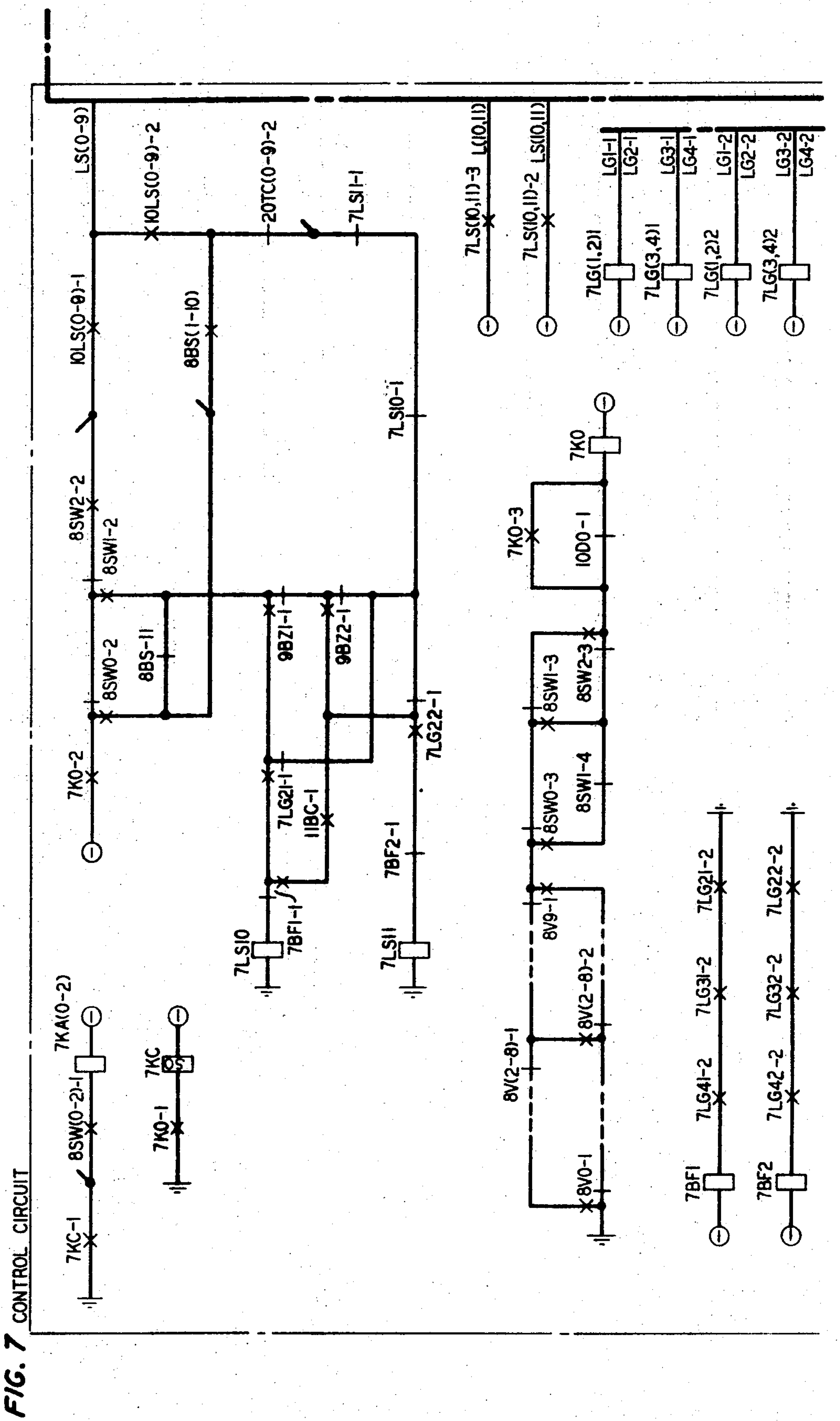
Figure 8:
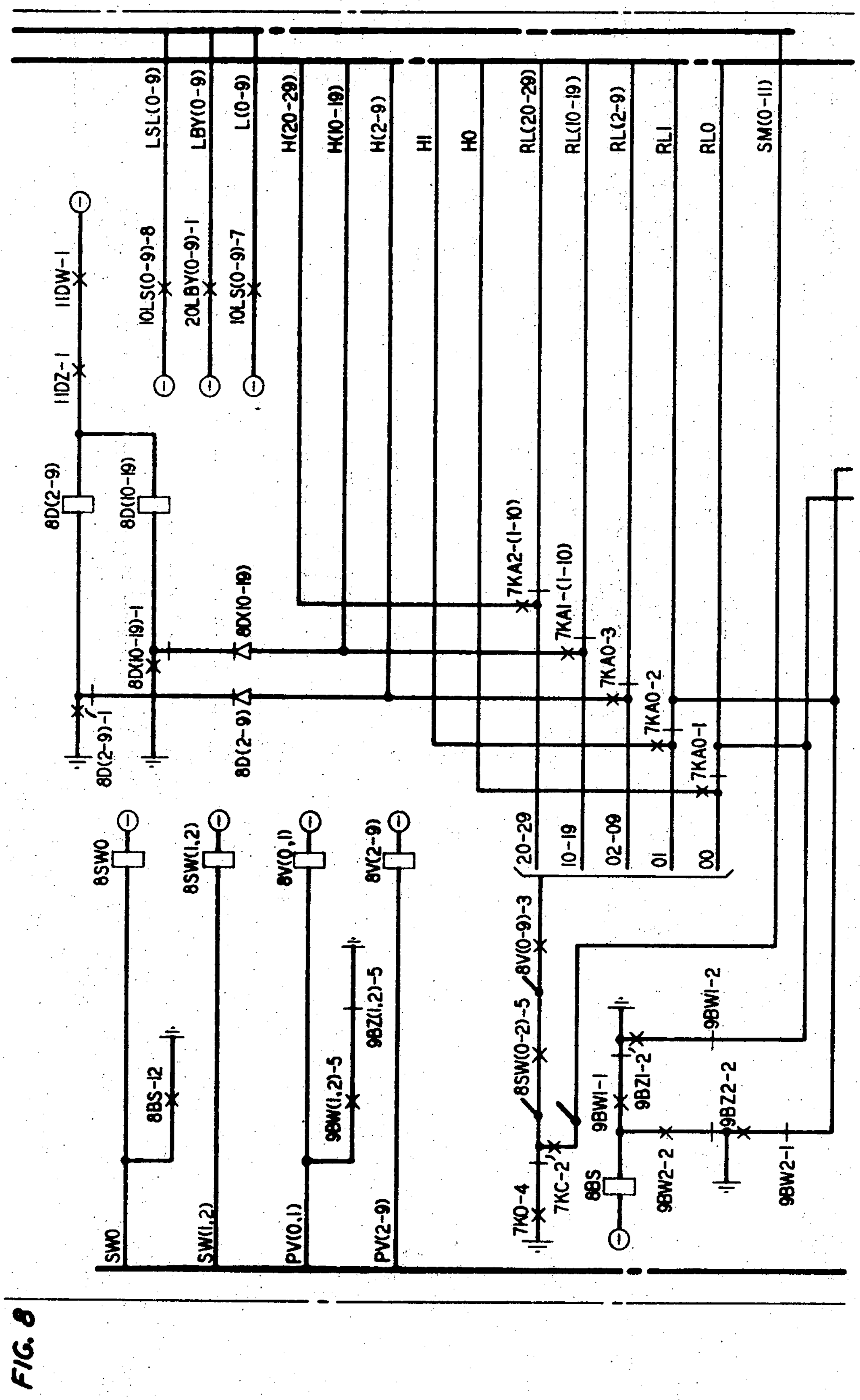

It will also be noted that in order to simplify the disclosure and thus facilitate a more complete understanding of the embodiment, the relays, relay contacts and other electromechanical devices shown in FIGS. 7 through 23 have been given systematic designations. Thus, the number preceding the letters of each device corresponds to the FIG. in which the control circuit of the device is shown. Thus, the coil of relay 7KO is shown in FIG. 7. Each relay contact, either make, break or transfer, is shown with its specific contact number preceded by the designation of the relay to which it belongs. For example, the notation 8BS–1 indicates contact number 1 of relay 8BS, the coil of which is shown in FIG. 8.

In order to further facilitate an understanding of the invention, the description of the operation of the exemplary embodiment has been subdivided into a general description portion designated 1.00 and a detailed description portion designated 2.00. Section 1.00 and its subsections describe the invention in general terms with respect to FIG. 1. Section 2.00 and its subsections describe the invention in detail with respect to FIGS. 3 through 24.

1.00 General Description

The equipment of the present invention may be advantageously associated with trunk or line circuits which are switched through a telephone switching system. One such system is disclosed in U.S. Pat. No. 2,585,904, dated Feb. 19, 1952, issued to A. J. Busch. It is to be understood, however, that the present invention is not limited to use with a system of this type but may be utilized with other types of systems or may, in fact, be independent of any switching system.

Figure 1:
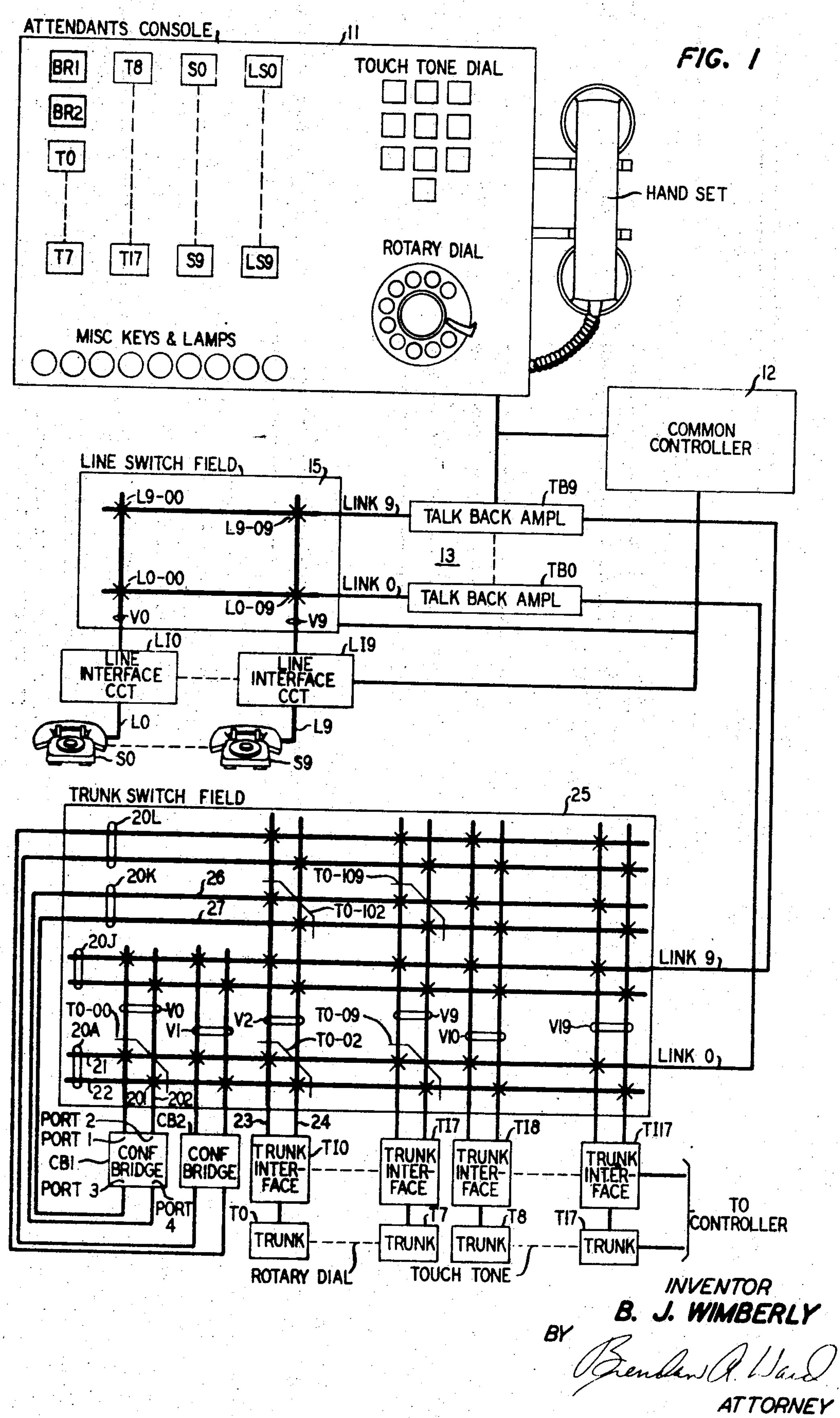
FIG. 1 comprises a block diagram showing the interrelation of the components of the exemplary embodiment.

Referring now to FIG. 1, the invention cited herein is embodied in a self-contained crossbar switching network automatically responsive to signals from an attendant's console. It is particularly concerned with apparatus in trunk interface circuits TI0 through TI17, conference bridge circuits CB1 and CB2, common controller 12, attendant position circuit 11, and trunk switch field 25. The remaining units, namely, line stations S0 through S9 and trunk circuits T0 through T17 are neither described nor shown in detail except where necessary for a complete understanding of the invention. However, the aforementioned Busch patent may be consulted where a complete understanding of the construction and operation of these units is desired.

In the illustrative embodiment, stations S0 through S9 are shown as being connected by lines L0 through L9 to line interface circuits LI0 through LI9, and trunks T0 through TI7 are shown as being terminated on trunk interface circuits TI0 through TI17. In the instant disclosure the trunks T0 through T17 may be advantageously arranged as two-way trunk circuits, as are well known in the art, and in the instant embodiment may comprise, as a circuit unit, the combination of an incoming and an outgoing trunk, described separately in the Busch disclosure. In addition, for discussion purposes, it will be noted that trunks T0 through T7 are rotary dial trunks, while trunks T8 through T17 are Touch-Tone trunks. However, any of these circuits may comprise any other type of trunk circuit or many instead consist of long distance line circuits or even mobile radio circuits.

Line interface circuits LI0 through LI9 are shown terminating on a corresponding one of verticals O0 through 9, respectively, of switch field 15. Trunk interface circuits TI0 through TI17 are shown terminating on the verticals 2 through 19, respectively, of switch field 25. As will become more apparent from that which is contained hereinafter, any number of links (horizontals) or communication circuits (verticals) can be added as are necessary to handle traffic conditions.

As shown in line switch field 15, by the closure of appropriate crosspoints in the well-known fashion, line circuits LI0 through LI9 have access collectively, via their respective verticals, to any horizontal or link. As will be apparent from that which is contained hereinafter, any number of line circuits can thereby be connected to the same link, with transmission possible, from the transmit pair of any one line circuit to the receive pair of any other line, through one of the talk-back amplifiers TB0 through TB9 associated with the connected link.

An inspection of the trunk switch field 25 will reveal that each horizontal 20A through 20L has, in addition to a main communication link 21, an auxiliary or subsidiary link 22. In order to simplify discussion of this point, as will be more fully understood from that which is to follow, it is to be understood that each heavy line, such as line 21, represent four horizontal multiples which comprise a communication bus. Trunk interface circuits have access to any horizontal through respective vertical multiples, such as vertical multiple 23, in the same manner as do the line circuits, with the important exception that each trunk also has access to the auxiliary multiple of any horizontal through a secondary appearance of the trunk circuit on the auxiliary vertical multiple, such as auxiliary vertical multiple 24.

One port of the conference bridge CB1 is connected, as well will be described in detail hereinafter, to the main appearance 201 of the first vertical multiple on trunk switch field 25. A second port of conference bridge CB1 is connected to the auxiliary appearance 202 of the same vertical multiple. A trunk, connected through to a conference bridge, in a manner to be more fully described hereinafter, via an auxiliary horizontal multiple, is enabled to engage in simultaneous two-way communications with all other trunks similarly connected through to the conference bridge.

1.01 Establishment of a Conference of Line Circuits

For purposes of illustration we shall assume that station S0 desires to establish a conference which includes stations S1 and S2 (which are not shown, but function in the same manner as does station S0). As will be more apparent hereinafter, the number of lines connected into the conference are not limited to three, but may comprise any desired number of stations.

When station S0 goes off hook, a lamp associated with the station at the attendant's console 11 is illuminated. It should be noted at this point that while only one attendant position is shown, in practice any number of consoles could be used and control of the conference connections distributed over several such positions.

Upon recognizing a request for service, the attendant momentarily depresses an idle link key (such as key LS0) and then depresses the associated station key, namely, key S0. As will be described in detail hereinafter, controller circuit 12 is thereupon activated to enable the crosspoints associated with the selected link, which in this instance would be the crosspoint designated L0–00 in switch field 15. Station S0 is thus connected, through the aforementioned interface circuit LI0 to the first horizontal of line switch 15, and as will be more apparent hereinafter, is thereby in telephonic communication with the attendant at attendant position 11.

Upon ascertaining from station S0 that stations S1 and S2 are to be the parties to the conference, the attendant proceeds to attach these parties to the conference link by depressing their associated nonlocking keys, namely, keys S1 and S2. Crosspoints L0–01 and L0–02 (which are not shown) are thereby closed to interconnect line conference link 0 with stations S0, S1 and S2 via talk-back amplifier TB0.

1.02 Addition of a Trunk Circuit to the Established Conference Link

While the above part of the general description pertains to a conference call involving only stations, it is equally possible for trunk circuits to be included in the conference. For example, assume that a party to an existing conference desires to communicate with a party located at a distant point. The attendant is signaled in the manner to be more fully described in the detailed description, and upon ascertaining that a remote station is to be included in the conference, depresses a trunk key associated with a rotary dial trunk, namely, key T0. The controller circuit is thereupon activated as will be described in detail hereinafter, and closes the appropriate crosspoint contacts in trunk switch field 25, which in this case would be contacts T0–02. The attendant, using the rotary dial on the console, dials the number of the desired party. Upon the called station going off hook, communication is established between the called party and the conference of line circuits via trunk conference link 0.

1.03 Addition of a Second Trunk to the Established Conference

Assume now that the attendant is instructed to add a second trunk to the conference which already includes stations S0, S1 and S2 and trunk T0 Since, as has been discussed previously, transmission requirements prohibit the paralleling of trunk circuits, additional trunk circuits cannot be added in the same manner as are line circuits. Therefore, upon ascertaining that a second trunk is to be added to an existing conference, the attendant momentarily depresses a bridge key, such as key BR1. The controller circuit, in the manner that will become apparent hereinafter, connects port 1 of bridge circuit CB1 to the first vertical multiple on trunk switch field 25 via contacts T0–00. As was described in paragraph 1.00, trunk circuit T0 then transfers from main horizontal 21 and terminates instead at port 2 of bridge circuit CB1 via vertical multiple 24 and auxiliary horizontal multiple 22. The momentary depression of trunk key T7 on the console causes the controller, in the manner to be more fully detailed hereinafter, to close crosspoint contacts T0–109, thus establishing connection for trunk T7 via horizontal multiple 20K to port 3 of bridge circuit CB1. Communication is then possible to and from trunk circuits T0 and T7, through respective ports of the conference bridge CB1, to the conference link O. Additional trunk circuits may now be added in a similar manner to additional ports of the bridge conference circuit.

Summarizing at this point, stations S0, S1 and S2 are connected, via conference link O on line switch 15 to the talk-back amplifier TB0 which in turn is connected to port 1 of conference bridge CB1 via trunk switch 25 and the main horizontal 21 of link O. Trunks TO and T7 are each terminated individually at ports 2 and 3, respectively, of conference bridge CB1, thus providing communication between all connected lines S0, S1 and S2 and all connected trunks TO and T7. The particular crosspoints discussed in FIG. 1 have been selected merely for purposes of illustration. It will be apparent from a reading of the detailed description that individual conferences may be established utilizing separate horizontals of the crossbar switch field in conjunction with any selected combination of lines or trunks.

1.04 Inhibiting Echo Suppression in any Connected Trunk

As has been discussed previously, echo suppression is automatically inserted into the transmission path of each trunk circuit upon association of that trunk with any port of the conference bridge. In the event that a particular trunk, such as trunk TO, for some reason does not require the external provision of echo suppression, a signal is transmitted, in a manner to be fully detailed hereinafter, from that trunk, via the established transmission path, to the conference bridge which inhibits the echo suppression circuitry. As will be more apparent hereinafter, the inhibited echo suppression circuitry, which is exclusively associated with the connected trunk, remains idle only as long as the inhibiting signal continues to be transmitted from the trunk.

1.05 Release of Conference Connection

Electrical control of the conference connection is automatically provided for each link. Therefore, upon abandonment of the call by all the parties to the conference link, all associated interface trunk and line circuits, as well as any enabled conference bridge, are released.

1.06 Position Release

As will be more apparent from a reading of the detailed description, the attendant may remain, if so desired, in a supervisory capacity as a party to the conference. In this capacity the attendant may add, as required, additional parties to the conference link during the course of the conference by proceeding, as described in paragraph 1.01, for line circuits and in paragraphs 1.02 and 1.03 for trunk circuits.

If supervision of the conference is not required, then upon the establishment of the conference the attendant momentarily operates a nonlocking key to release the attendant position from the conference connection. The attendant is thus free to establish other conference connections or to perform other attendant functions. In the meantime, the conference may proceed between the selected lines and the selected trunks.

2.00 Detailed Description

Figure 2:
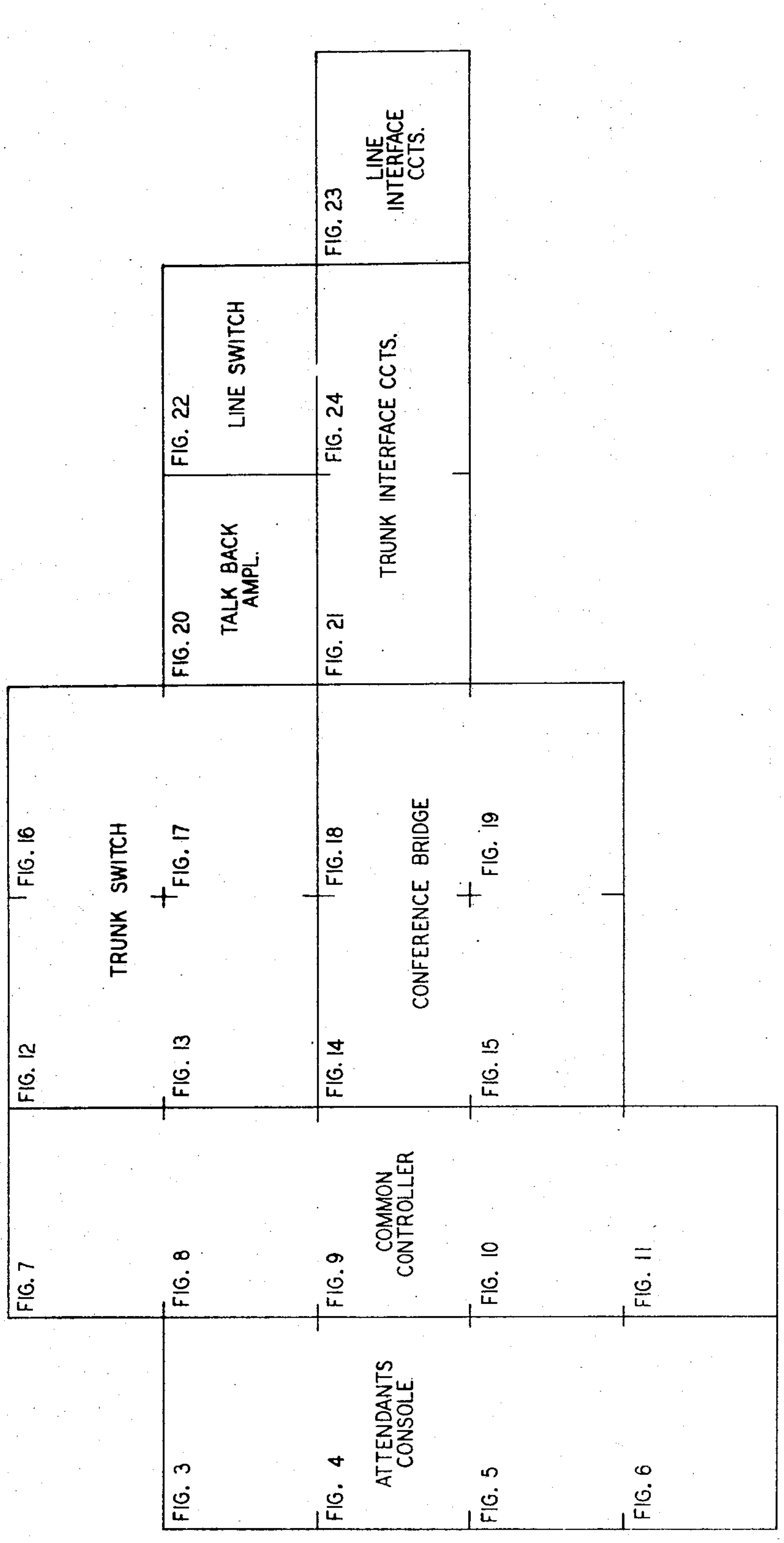
FIG. 2 depicts the position in which the various FIGS. should be placed.

FIGS. 3 through 24 have been arranged as shown in FIG. 2 to facilitate a reading of the detailed description as contained herein. For purposes of explanation, we shall assume that station S0 shown in FIG. 23 desires to establish a conference which includes stations S1 and S2 and further includes three stations TO shown in FIG. 21, and T7 and T8, FIG. 24, which are located at some distant point. We shall also assume that another station incoming to the system over trunk T1, FIG. 21, desires to establish a conference connection with local stations S3, S4 and S5, FIG. 23, and with trunk T17, FIG. 24. In addition, in order more fully to illustrate the flexibility of the system, these two independent conferences will be connected together to form a single conference comprising stations S0, S1, S2, S3, S4 and S5 and trunks T0 T1, T7, T8 and T17.

It should be noted at this point that in order to simplify the disclosure and to eliminate undue repetition, stations S1 through S9, and their associated interface circuits, LI1 through LI9 have not been shown in detail. However, each of these elements function substantially similar to the corresponding element which is shown, namely station S0 and interface circuit LI0, respectively, so that whenever these elements are referred to herein, reference can be made to the detailed element shown in FIG. 23. In like manner, trunk circuits T1 through T17 together with their interface circuit TI1 through TI17 also have not been detailed. Accordingly, whenever these elements are referred to herein, reference can be made to the detailed element shown in FIG. 21 corresponding to the referenced element.

2.01 Offhook Signal from Station S0 to Attendant Position 11

Figure 23:
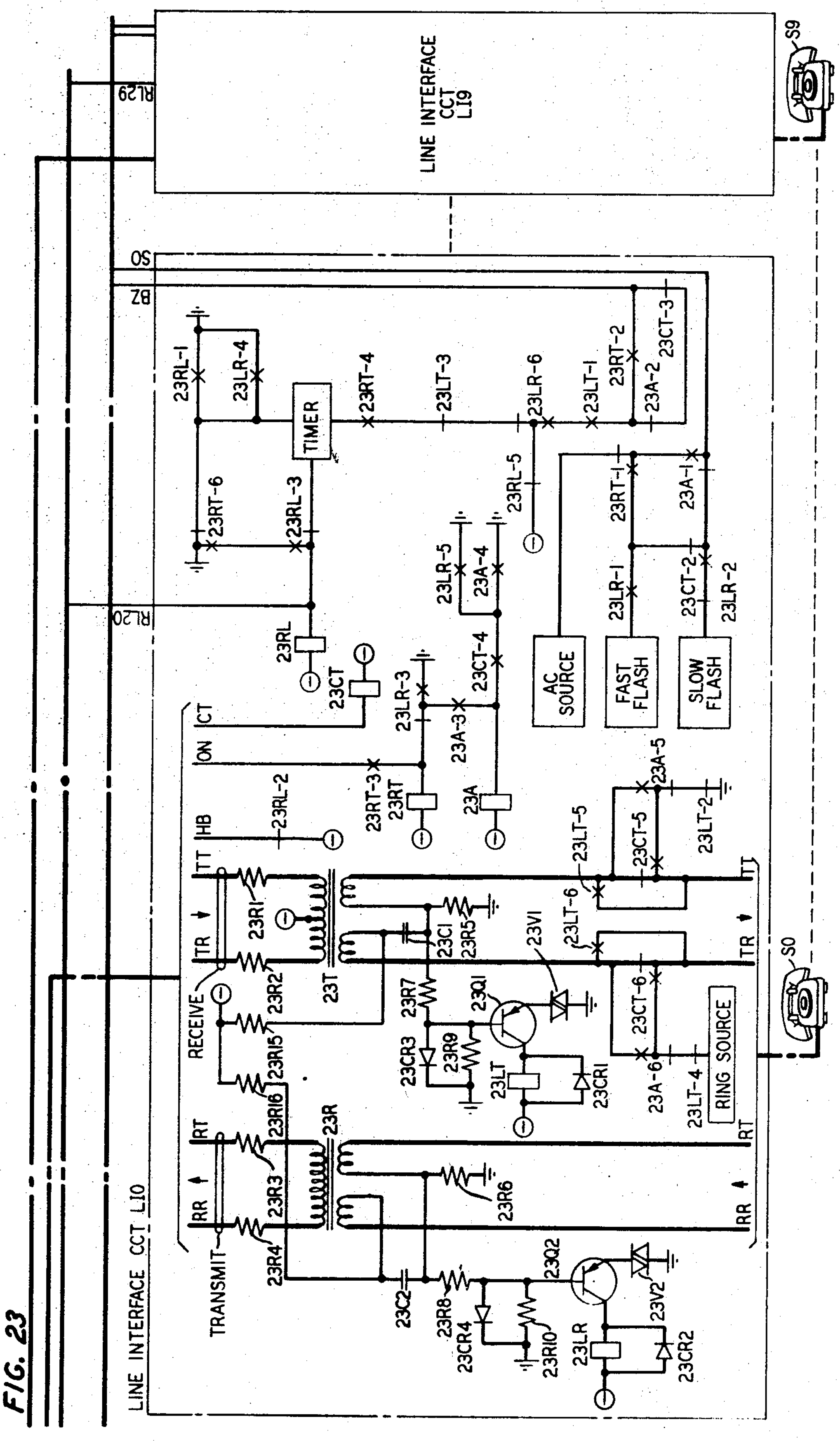

Referring now to FIG. 23, when station S0 goes off hook, battery is extended through resistor 23R15 and inductor 23T, through released break contact 23CT–6 over the TR lead to the station receiver, through the receiver and back over lead TT, through released break contact 23CT–5, through the 23T inductor and 23R7 resistor to the base of transistor 23Q1. Application of negative battery to the base of transistor 23Q1 causes the conduction of current and accordingly the operation of relay 23LT by an obvious circuit. Similarly, battery is extended through resistor 23R16 and inductor 23R over the RR lead, through the transmitter of station S0 and back over lead RT, through the 23R inductor and 23R8 resistor to the base of transistor 23Q2, thereby operating relay 23LR by an obvious circuit. It should be noted that resistors 23R5, 23R6, 23R7 and 23R8 are provided for voltage and current control while resistors 23R9 and 23R10, in conjunction with their respective diodes 23CR3 and 23CR4, protect the transistors against high voltage surges. Varistors 23V1 and 23V2 are provided for similar protection.

Figure 4:
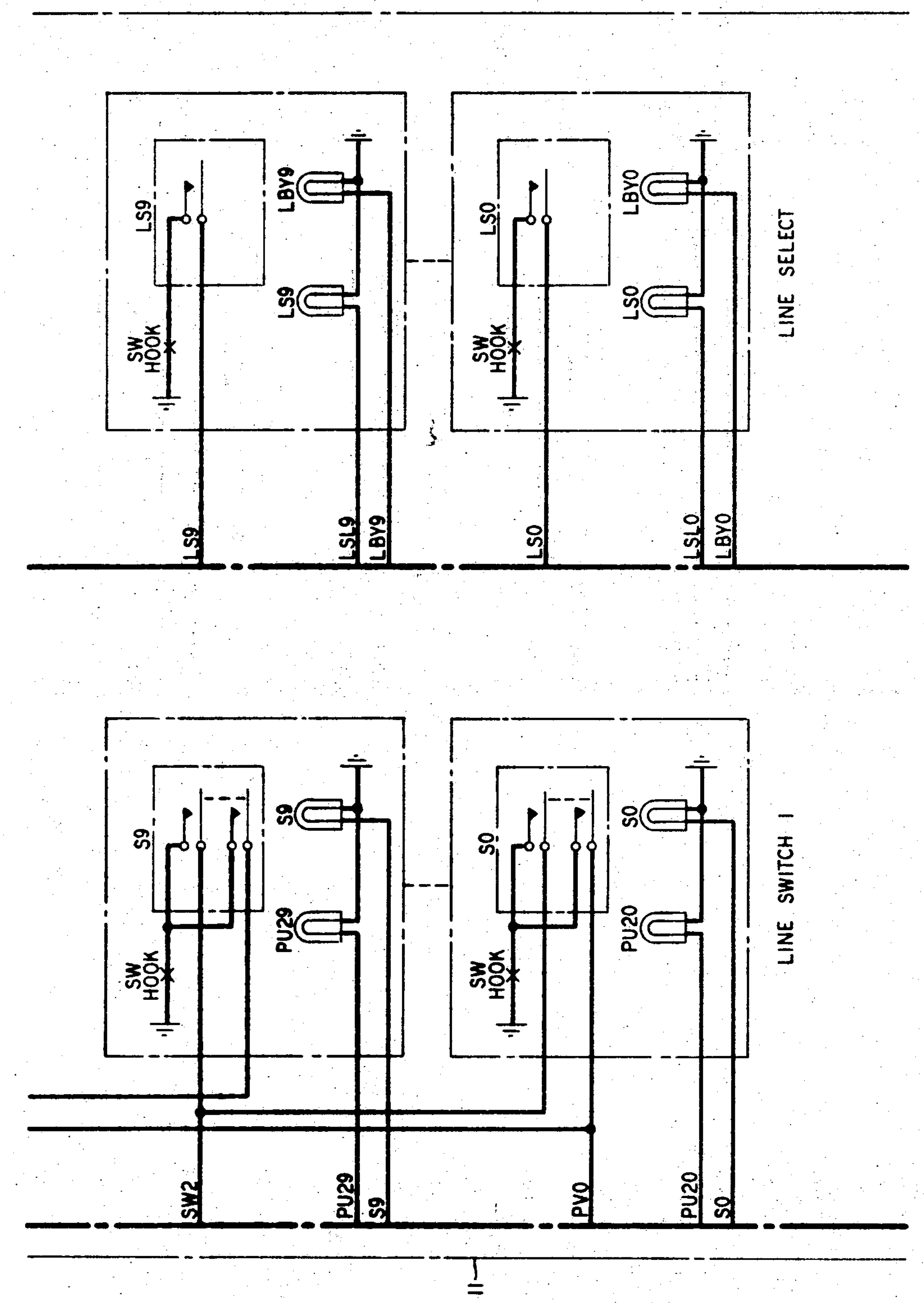

The operation of relay 23LR connects a source of fast-flash potential, which is not shown in detail but which may comprise any number of configurations well known in the art for enabling the periodic illumination of signal lamps in a predetermined frequency, through operated make contact 23LR–1, through normal break contacts 23CT–2 and 23A–1 over lead S0 to energize lamp S0 in the console, FIG. 4 in a flashing manner. Battery is extended over lead BZ, FIG. 23, upon the operation of relay 23LT via normal break contact 23RL–5, operated make contacts 23LR–6 and 23LT–1, and normal break contacts 23A–2 and 23CT–3, which sounds buzzer 610 at the attendant's console, FIG. 6. The enabling of lamp S0 and buzzer BZ alerts the attendant that a party desires to utilize the conference network.

2.02 Attendant Selects an Available Conference Link

Referring now to FIGS. 4, 5, 6 and 10, the attendant, upon recognizing a request for service, removes the handset from the switch hook and operates an idle link key; in this case, nonlocking key LS0 in FIG. 4. The enabling of key LS0 causes ground to be extended over lead LS0, via the operated switch hook contact and key LS0, to the controller circuit, FIG. 10, through the winding of relay 10LS0, to battery via released break contacts 9BW1–4 and 9BW2–4, thus operating relay 10LS0. The enabling of relay 10LS0 causes a holding battery to be extended to the secondary winding of coil 10LS0 through operated make contact 10LS0–3. Holding ground is connected to the other side of the secondary winding through operated make contact 10LS0–4 and the normal break contact chain comprising contacts 10LS1–4 through 10LS9–4, over the PRL lead from FIG. 5 and the normal PRL key. Accordingly, the operation of relay 10LS0 causes the operation of relay 10LSA0 over an obvious path via enabled make contact 10LS0–6.

Digressing for a moment, it will be noted that in order to simplify the disclosure certain relays having identical operate paths have been shown in a systematic manner. Thus, for example, the ten relays designated 10LSA0 through 10LSA9 appear in FIG. 10 associated with a single relay coil designated 10LSA(0–9). It is to be understood also that all relay contacts shown associated with these relays represent a one-for-one correspondence between similarly designated elements. Thus contact 10LS0–6 is operative to enable the 10LSA0 relay while the operation of contact 10LS9 enables relay 10LSA9.

Figure 6:
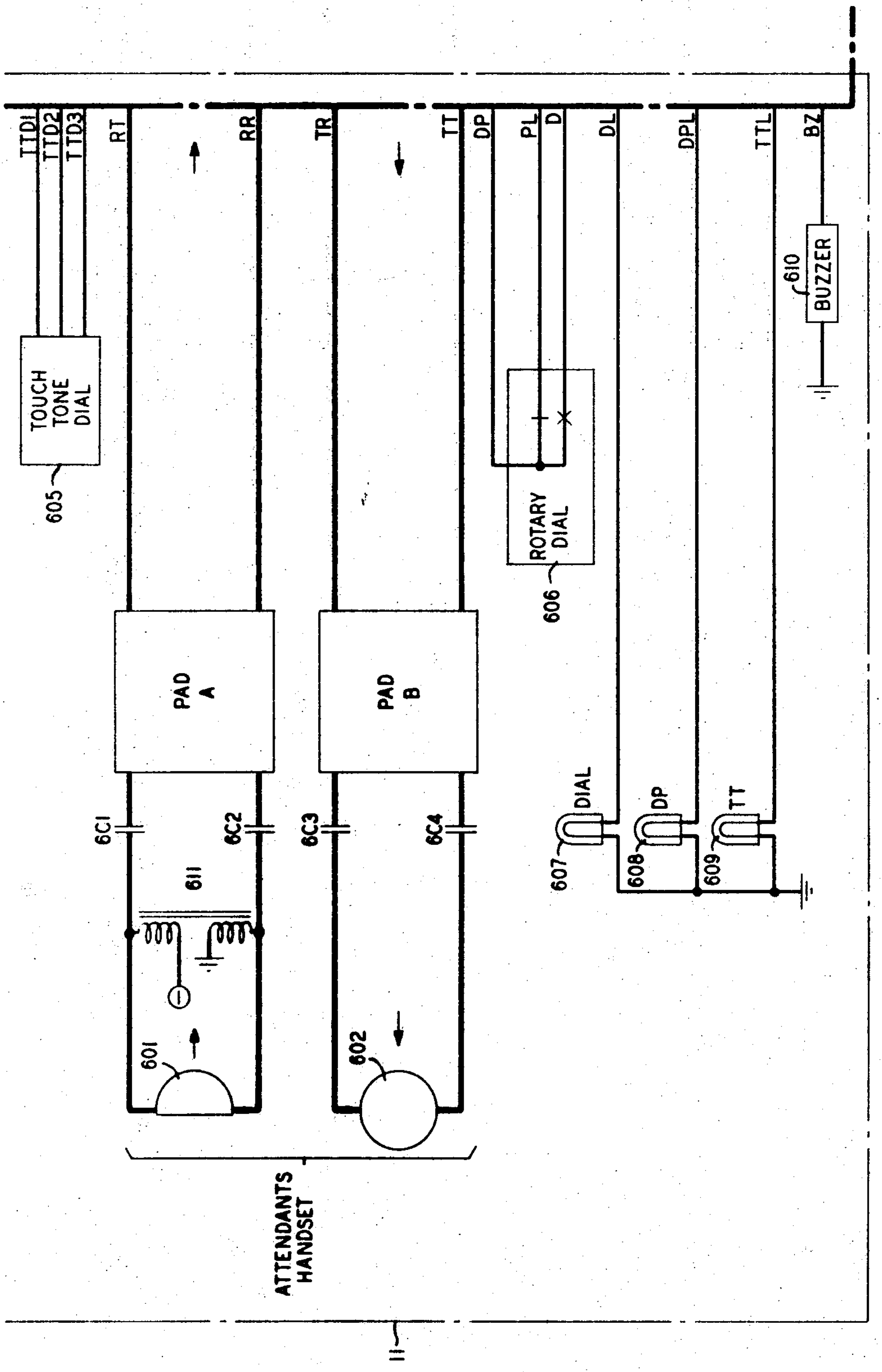
Figure 20:
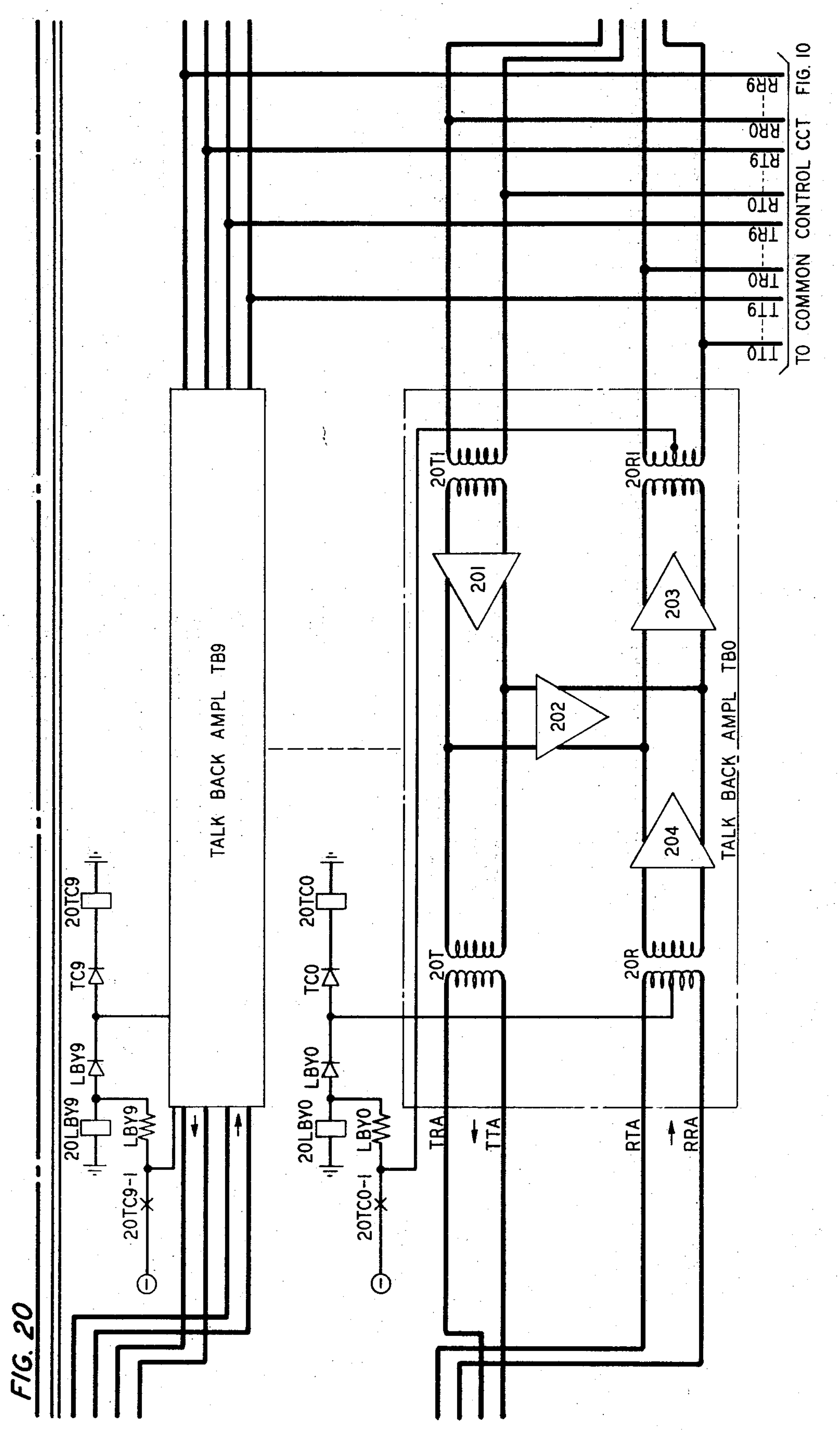

Returning now to FIG. 10, operation of relay 10LSA0 prepares a path from the attendant's handset, FIG. 6, through pads A and B, over leads RT, RR, TR and TT, through the controller circuit, FIG. 10, and via enabled make contacts 10LSA0–2, 10LSA0–3, 10LSA0–4 and 10LSA0–5 to talk-back amplifier TB0, FIG. 20, over leads RT0, RR0, TT0 and TR0. The operation of relay 10LS0 further provides an enabling path for illuminating the connecting lamps PU (20—29) on the console, FIG. 4, from ground through the lamps and via leads PU (20—29) to line switch O, FIG. 22, through any subsequently operated crosspoint to any horizontal multiple, such as horizontal multiple 223, and through FIGS. 20 and 17 to the corresponding lead L0–L9 in FIG. 13 and then to battery in FIG. 8 via any enabled make contact 10LS(0—9) –7. Operation of relay 10LS0 also extends a battery over lead LSL0, FIG. 8, via enabled make contact 10LS0–8 to the link select lamp LS0, FIG. 4, thereby indicating the selection of link O. Thereupon, the attendant releases key LS0.

2.03 Connection of Attendant Position with Station S0

Referring now to FIGS. 4, 7, 8 and 23, the attendant operates nonlocking key S0 at the attendant position, FIG. 4. The enabling of key S0 places a ground on leads PV0 and SW2, thereby operating relays 8V0 and 8SW2 in the controller circuit, FIG. 8, in an obvious manner. Accordingly, the operation of these two relays cause the operation of relay 7K0 over a path from ground through enabled make contact 8V0–1, released break contacts 8V2–1 through 8V9–1, released break contacts of 8SW0–3 and 8SW1–3, operated make contact 8SW2–3 and released break contact 10D0–1 and through the winding of relay 7K0 to battery. The operation of relay 7K0 extends a ground through operated make contact 7K0–4, FIG. 8, released break contact 7KC–2, operated make contacts 8SW2–5 and 8V0–3 and over lead 20 to the line interface circuit LI0, FIG. 23, via released break contact 7KA2–1 and lead RL20. Accordingly, relay 23RL in the interface circuit LI0, operates in an obvious manner from ground over the RL0 lead. As will be more apparent from that which is contained hereinafter, the enabling of relay 23RL removes the holding battery from the hold magnet of the associated vertical multiple in the event that the crosspoint had been previously operated.

Figure 22:
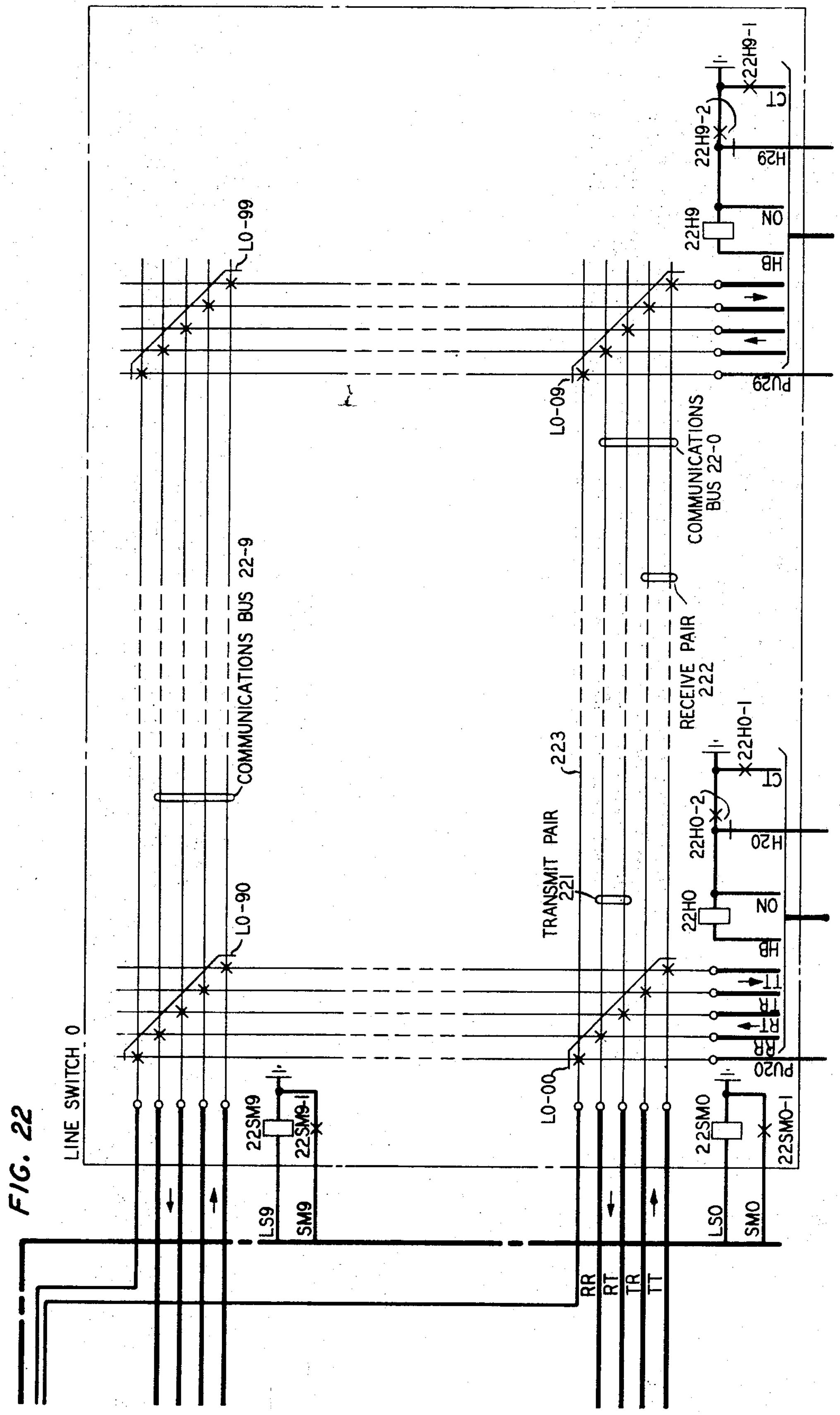

Referring now to FIGS. 7, 8, 22 and 23, operation of relay 7K0 provides an operate path for select magnet 22SM0 from battery, FIG. 7, through operated make contact 7K0–2, through released break contacts 8SW0–2 and 8SW1–2, operated make contact 8SW2–2, operated make contact 10LS0–1 and over lead LS0 to the winding of select magnet 22SM0, FIG. 22, thereby enabling horizontal level O (link O). Operation of relay 7K0 also starts the operation of slow operate relay 7KC. Operation of relay 7KC operates relay 7KA2 from ground, through operated make contacts 7KC—1 and 8SW2–1, through the winding of relay 7KA2, to battery. Relay 7KA2 operating removes ground from lead RL20, FIG. 8, thereby releasing relay 23RL. Relay 23RL releasing, extends a hold battery to the coil of hold magnet 22H0, FIG. 22, via lead HB and released break contact 23RL–2 in FIG. 23.

Returning again to FIG. 22, operation of select magnet 22SM0 extends a ground over lead SM0 via enabled make contact 22SM0–1 to FIG. 8 and then via enabled make contacts 7KC–2, 8SW2–5, 8V0–3, 7KA2–1 and lead H20 to FIG. 22 normal break contact 22H0–2 and the winding of hold magnet 22H0. Accordingly, the operation of hold magnet 22H0 extends a ground over lead CT to line interface circuit LI0, FIG. 23, to battery through the winding of the 23CT relay. Accordingly, relay 23CT operates and removes the battery from lead BZ, thereby silencing the console buzzer. The enabling of relay 23CT also provides an operate path for relay 23A from ground via operated make contacts 23LR–5 and 23CT–4 in an obvious manner. The subsequent operation of relay 23A removes the fast flash potential from lead SO and extends steady current to the S0 lamp via normal break contact 23RT–1, operated make contact 23A–1 via lead S0 to the console. The steady condition of signal lamp S0 on the attendant console signifies that station S0 is off hook and connected through the switch network to the selected link. Thereupon, the attendant releases keys LS0 and S0, FIG. 4, which action opens the above-described operate paths of relays 8SW2, 8V0, 7KO, 7KC and 7KA2, as well as the operate path for select magnet 22SM0 thereby causing the release of these relays and the select magnet. However, the hold magnet 22H0 is locked operated to ground under control of its own make contact 22H0–2 and from battery from line interface circuit LI0, FIG. 23, over lead HB.

Summarizing at this point, upon the recognition by the attendant that a particular line desired to utilize the conference network, the calling party was connected through to a selected horizontal link so as to connect the attendant's handset with the calling party. It should also be noted that upon connection of line interface circuit LI0 with talk-back amplifier TB0, battery is extended over the TT–TR pair from FIG. 23, via inductor 23T to inductor 20R1, FIG. 20, and to the 20LBY0 relay through resistor LBY0. Operation of relay 20LBY0 provides an indication, in the manner to be more fully detailed hereinafter, that link O is in use.

2.04 Establishment of a Conference of Line Circuits

As discussed above, it is assumed that station S0 desires to confer with stations S1 and S2. The attendant proceeds to attach the desired stations to the selected conference link by sequentially depressing the associated nonlocking keys, namely, keys S1 and S2 (not shown but identical to key S0, FIG. 4). Operation of key S1 extends ground over leads PV1 (not shown) and SW2 to the controller circuit, FIG. 8, and through the windings of relays 8V1 and 8SW2 to battery. Accordingly, relays 8V1 and 8SW2 thereupon operate and enable the operation of relay 7K0 in substantially the same manner as previously set forth. Operation of relay 7K0 enables the operation of select magnet 22SM0, also as previously set forth. The operation of relay 7K0 also enables relay 7KC in an obvious manner. Select magnet 22SM0 in operating extends ground from its off normal make contact 22SM0–1, FIG. 22, over lead SMO to the control circuit, FIG. 8, through operated make contacts 7KC–2, 8SW2–5, 8V1–3 and 7KA2–2, over lead H21 to the winding of line crossbar switch hold magnet 22H1 (not shown) and through the winding to battery via lead HB to the line interface circuit LI1, FIG. 23 through released break contact 23RL–2. As has been set forth previously, line interface circuit LI1 has not been detailed. However, reference may be had to line interface circuit LI0, FIG. 23, for specific circuit details.

The operation of hold magnet 22H1 extends ground, in the same manner as previously described for hold magnet 22H0, to line interface circuit LI1, FIG. 23, which operates relay 23CT therein. Operation of relay 23CT with relay 23LR released (as is the case when the attendant is signaling a line circuit) enables a source of slow flash to be extended over released break contact 23LR–2, operated make contact 23CT–2, released break contact 23A–1, via lead S1 to the associated signal light on the console. Operation of relay 23CT also applies ringing potential, in the well-known manner, over lead TR to station S1 via released break contacts 23LT–4 and 23A–6 and operated make contact 23CT–6.

When the called station goes off hook, relay 23LR operates in the same manner as previously set forth. Accordingly, the operation of relay 23LR applies a ground to the winding of relay 23A via operated make contacts 23LR–5 and 23CT–4. The enabling of relay 23A removes ringing potential from lead TR and also changes the slow flashing condition of the signal light on the console to a steady illumination by connecting lead S1 to steady a.c. current, via operated make contact 23A–1 and released break contact 23RT–1 in line interface circuit LI1. The attendant, upon observing the steady signal condition of lamp S1, proceeds to operate key S2 which then enables the connection of station S2 in substantially the same manner as set forth above with the result that stations S0, S1 and S2 are all now connected to the same horizontal link, and, as will become apparent from that which is contained hereinafter, are in telephonic communication with each other.

2.041 Communication between the Connected Stations and the Attendant

Referring again to FIG. 23, signals passing from receive leads RT and RR of any station will pass through inductor 23R of the associated interface circuit and will then appear on communication bus 22–0, transmit pair 221 of line crossbar switch O, FIG. 22, via the selected vertical multiple. The signals will then be conveyed to talk-back amplifier TB0, FIG. 20, via leads RR and RT and be amplified by amplifiers 201, 202 and 203 and transmitted back to the stations over leads TR and TT to receive pair 222 of communication bus 22–0 and then to all the connected stations via their respective receive leads TT and TR. The attendant's handset, which is also connected to the talk-back amplifiers, via leads RT0, RR0, TT0 and TR0 in the manner set forth previously will also be in the communication path thereby allowing communication among all the connection stations S0, S1 and S2, as well as with the attendant.

2.05 Addition of a Trunk Circuit to the Established Conference

Figure 3:
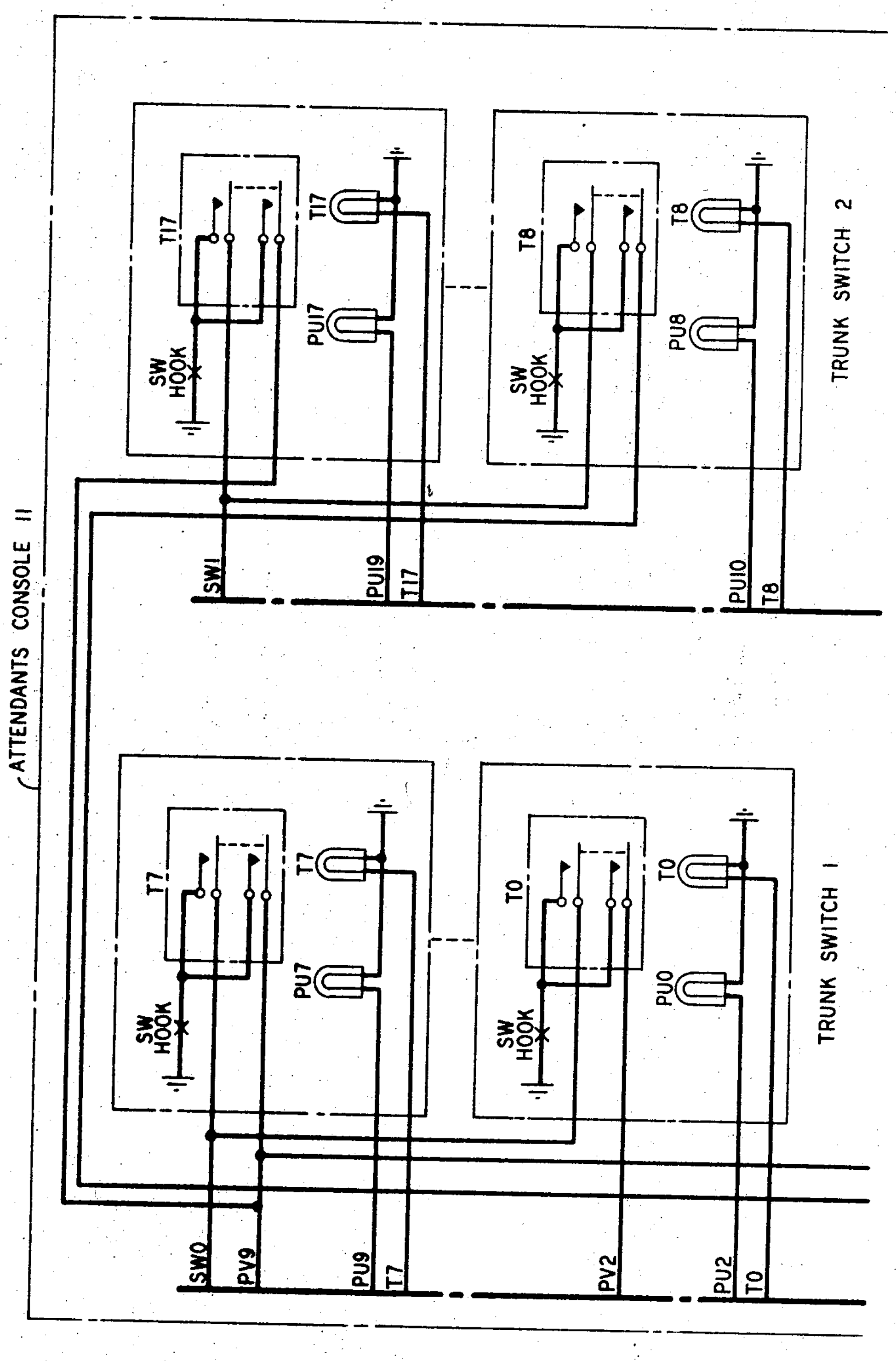
FIGS. 3 through 24 show in greater detail the interrelation of the components of the exemplary embodiment.
Figure 21:
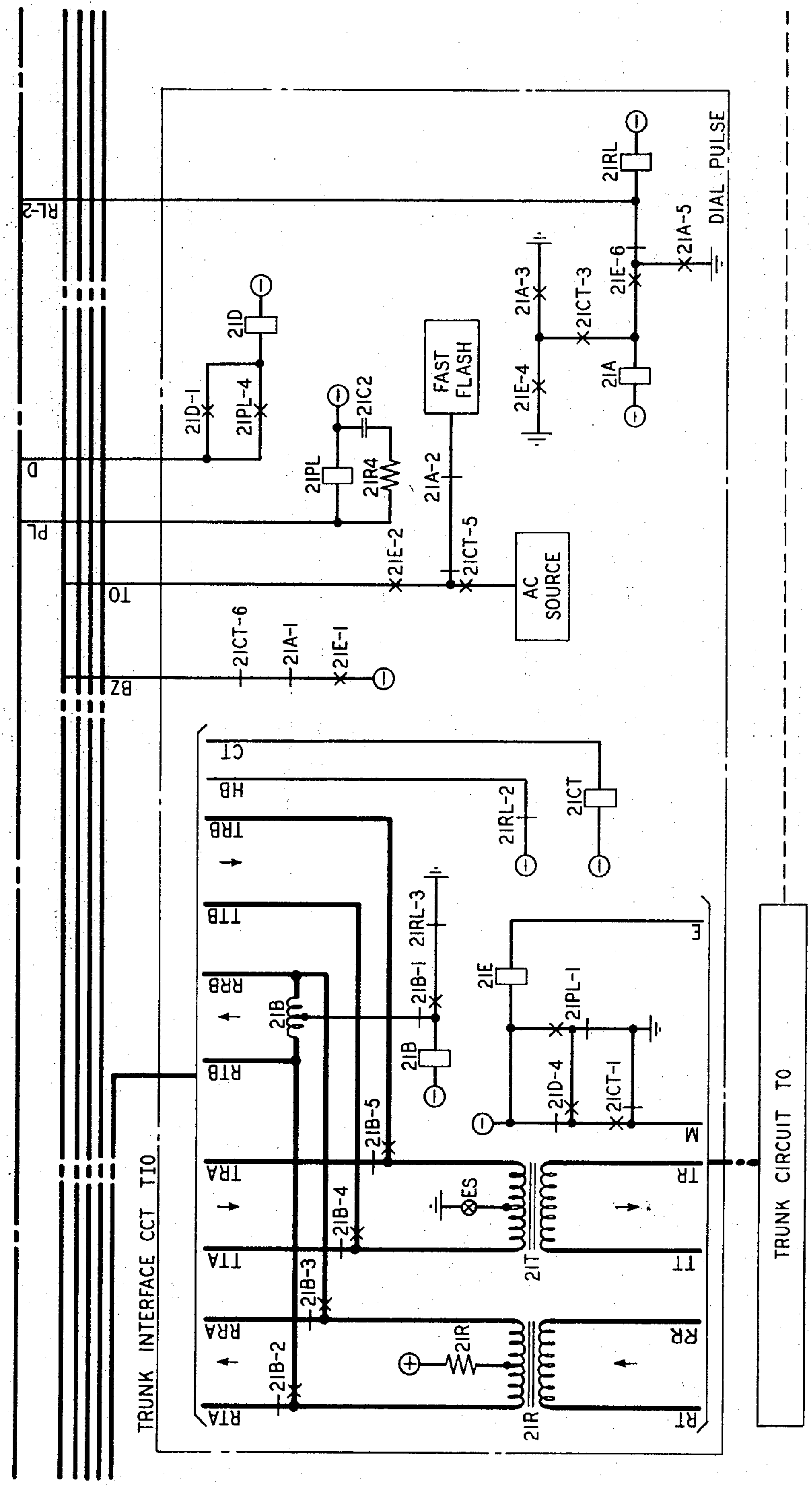

Referring now to FIG. 21, it will be assumed that trunk circuit TO is to be used in order to reach a party located at some distant point which is served only by the commercial switching system. The attendant depresses the dial key, FIG. 5, which extends a ground over lead DK to the controller, FIG. 11, thereby enabling relay 11DW via normal break contact 11DW–2, to battery through the winding of relay 11DW and resistor 11DW. Since ground is present on both sides of the 11DZ relay, via normal break contact 11DZ–2, relay 11DZ remains normal. Accordingly, when the attendant releases the dial key, ground is removed from the DK lead, thereby enabling the operation of relay 11DZ. Accordingly, the operation of both the 11DW and the 11DZ relays prepares an operate path for relay 8D2. The importance of this path will become more apparent hereinafter. Referring now to FIG. 3, the attendant depresses key TO on the console. Accordingly, operation of key TO extends a ground to the controller circuit, FIG. 8, via leads PV2 and SW0 thereby causing the operation of relays 8V2 and 8SW0 in an obvious manner. The enabling of these two relays enables the operation of relay 7K0 in substantially the same manner as previously set forth for line circuits. Relay 7K0 in operating enables the operation of select magnet 13SM0 over lead LS0 in the manner previously described for select magnet 22SM0 and also enables relays 7KC and 7K0 in an obvious manner.

Select magnet 13SM0 in operating extends ground via its own make contact 1 and lead SM0 to the controller circuit, FIG. 8, and in substantially the same manner as set forth in subsection 2.03 via lead H2 to the coil of hold magnet 13H2 and through the coil to battery via lead HB to trunk interface circuit TI0, FIG. 21, and released break contact 21RL–2. The enabling of the corresponding crosspoint T0–02 accordingly enables the illumination of the corresponding trunk lamp PU0 on the console, FIG. 3, via lead PU2 to the crosspoint vertical multiple PU2 lead, FIG. 13, the horizontal multiple L0 lead and enabled make contact 10LS0–7, FIG. 8, to battery.

Operation of hold magnet 13H2 extends ground via its own operated make contact 13H2–1 over lead CT to trunk interface circuit TI0, FIG. 21, and through the winding of relay 21CT to battery. Accordingly, the operation of relay 21CT removes ground and extends battery through enabled transfer contact 21CT–1 over the M signal lead to the central office switching system, thereby signaling the system, in the well-known manner, that a party desires to utilize the network.

A ground, signifying the attachment of a central office register, in the well-known manner, is returned to the trunk interface circuit over lead E, thereby operating relay 21E. The enabling of relay 21E causes the lamp on the console associated with trunk TO to light by providing a source of potential over enabled make contacts 21CT–5 and 21E–2 on lead TO. Relay 21E operating at this time also operates relay 21A from ground over enabled make contacts 21E–4 and 21CT–3. Thereupon, relay 21A locks operated from ground via enabled make contacts 21E–6 and 21A–5.

Figure 13:
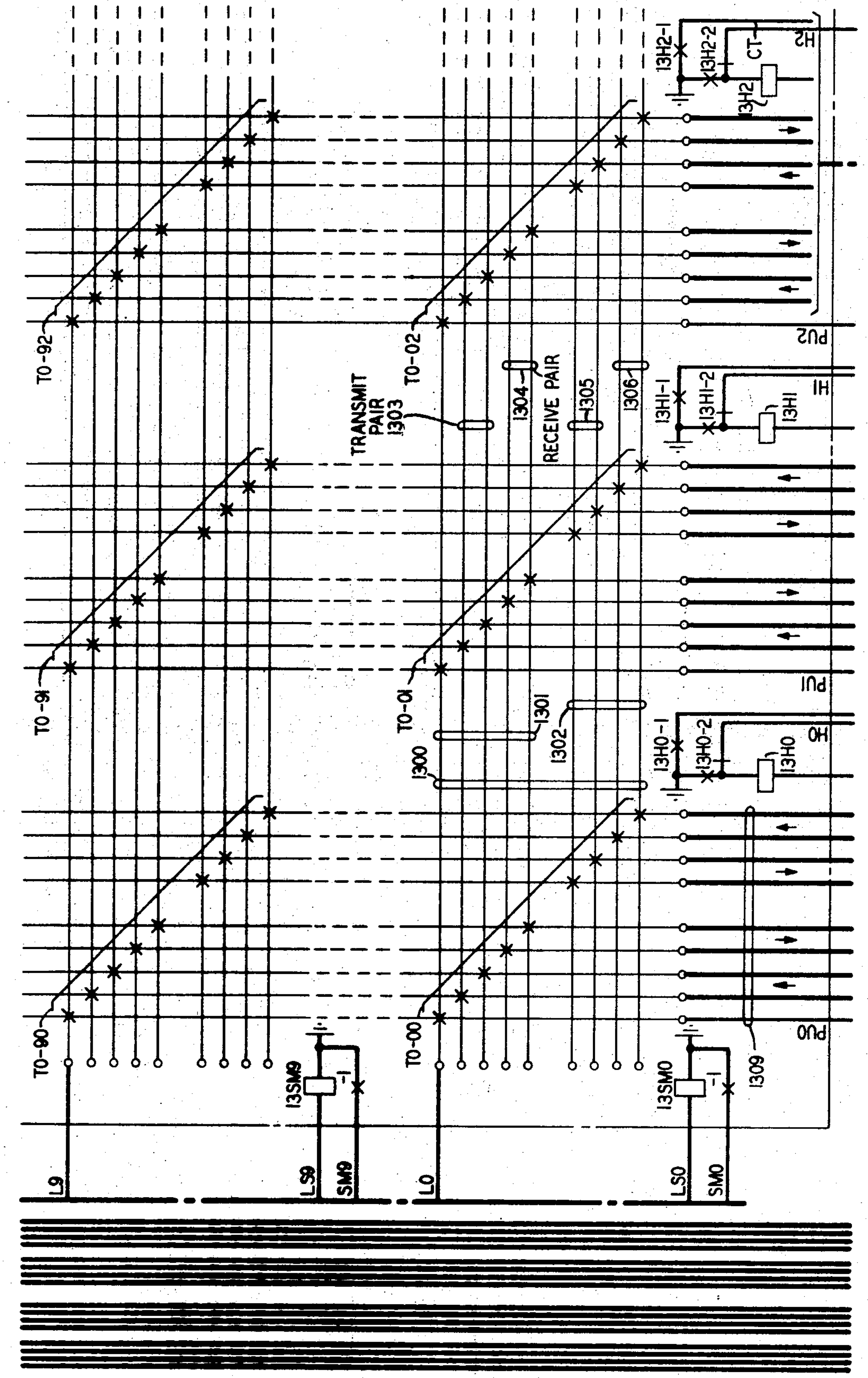
Figure 17:
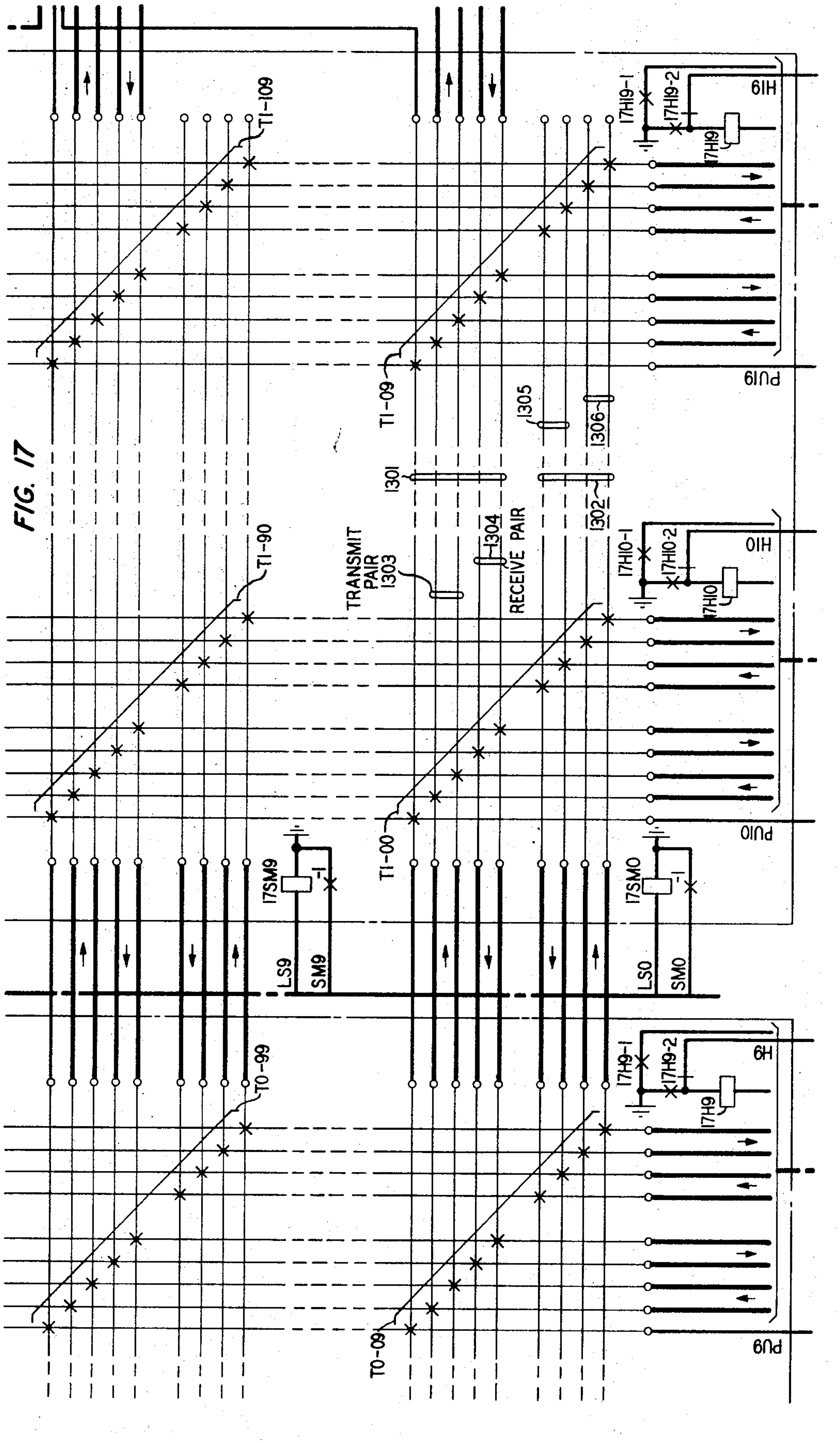

Summarizing at this point, trunk interface circuit TI0, FIG. 21, is connected to the existing station conference via leads TTA, TRA, RTA and RRA, via crosspoints T0–02, FIG. 13, and horizontal link 1301, FIG. 17, to talk-back amplifier TB0, FIG. 20.

Returning now to FIG. 21, upon the connection of the trunk interface circuit to the horizontal multiple, 1301, a positive potential is extended through resistor 21R and inductor 21R of the interface circuit LI0, FIG. 21, released break contact 21B–2 and 21B–3 and via leads RTA and RRA, through horizontal multiple 1301, FIG. 13, to the talk-back amplifier TB0, FIG. 20, through the 20R inductor, forward biased diode TC0 through the 20TC0 relay coil to ground. Accordingly, the operation of relay 20TC0 marks the connection of a trunk to the first link of the trunk switch. Relay 20TC0 operated also enables the operation of relay 20LBY0 in the obvious manner from battery via the enabled make contact 20TC0–1. Operation of relay 20LBY0 extends battery via enabled make contact 20LBY0–1 and lead LBY0, FIG. 8, to illuminate lamp LBY0, FIG. 4, thereby signaling the attendant that the corresponding link is associated with a trunk circuit.

2.051 Attendant Dials the Called Party

Returning now to FIG. 8, the enabling of select magnet 13SM0, in addition to operating hold magnet 13H2 as previously set forth, also enables the operation of relay 8D2 from ground on lead SM0, FIG. 13, to FIG. 8, and via enabled make contacts 7KC–2, 8SW0–5, 8V2–3, 7KA0–3, forward biased diode 8D2 and normal break contact 8D2–1 to the winding of the 8D2 relay. Battery is present on the other side of the 8D2 relay winding via the previously prepared operate path, as discussed hereinbefore. Since trunk circuit TO is a dial trunk, operation of relay 8D2 operates relay 10DP, FIG. 10, via a ground from enabled make contact 8D2–2 over a strap from terminal D2 to DP to battery through the winding of relay 10DP. The enabling of relay 10DP enables the operation of relay 10D0 via enabled make contact 10DP–4 to battery through the winding of relay 10D0. Accordingly, the operation of relay 10D0 prevents the selection, by the attendant, of any other trunk or any other station as long as the console remains in the dial mode. This is necessary in order to prevent dialing over more than one trunk at a time. Turning to FIG. 7, it can be seen that this feature is accomplished by break contact 10D0–1 which prevents the operation of relay 7K0 while relay 10D0 remains operated. Returning to FIG. 10, the enabling of relay 10DP provides a ground on lead DP through enabled make contact 10DP–1 to the rotary dial 606 on the console FIG. 6. The DP lamp on the console is lighted at this time by a battery extended from the controller via lead DPL of FIG. 11 and enabled make contacts 10D0–3 and 10DP–5.

Figure 10:
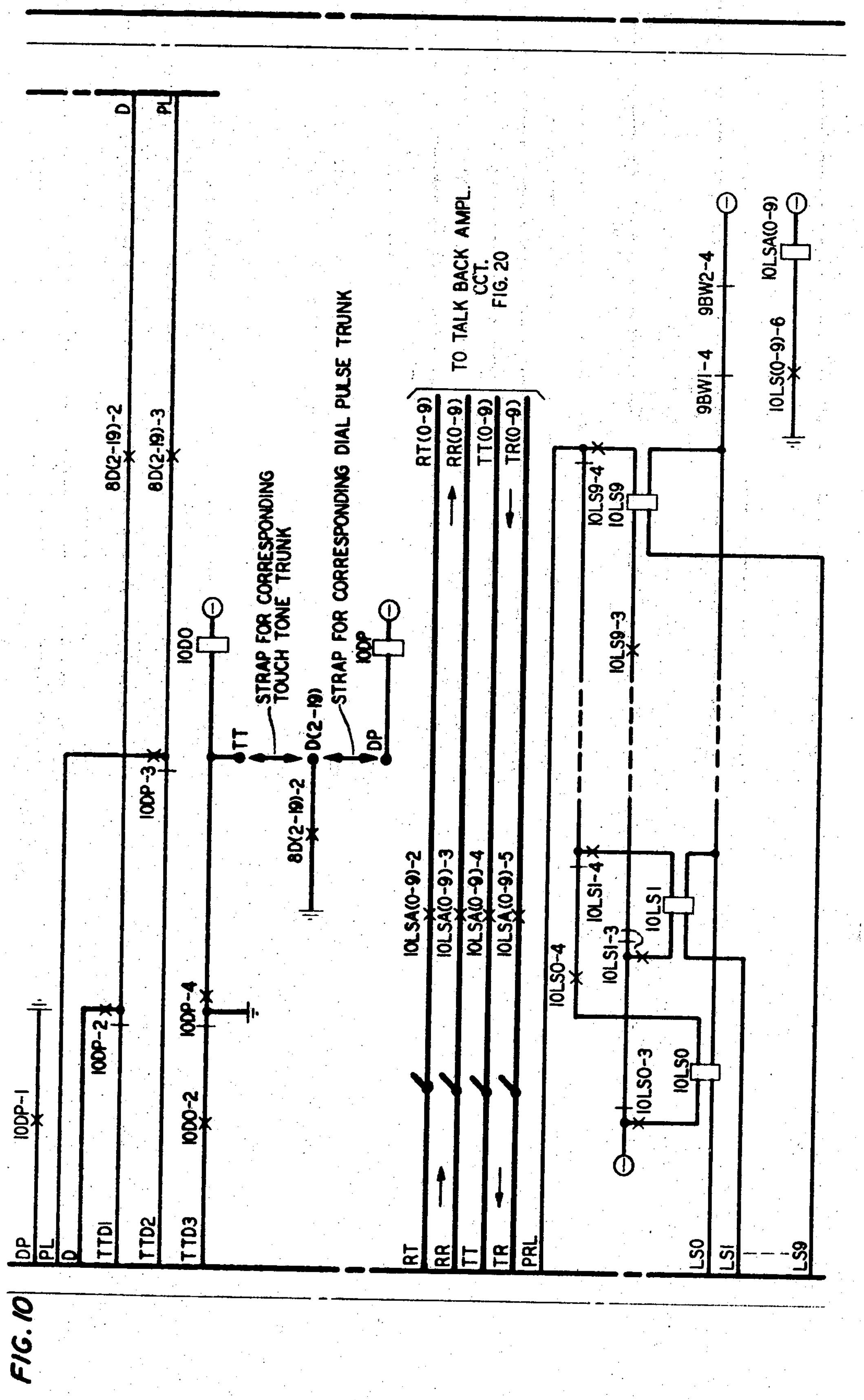
Figure 11:
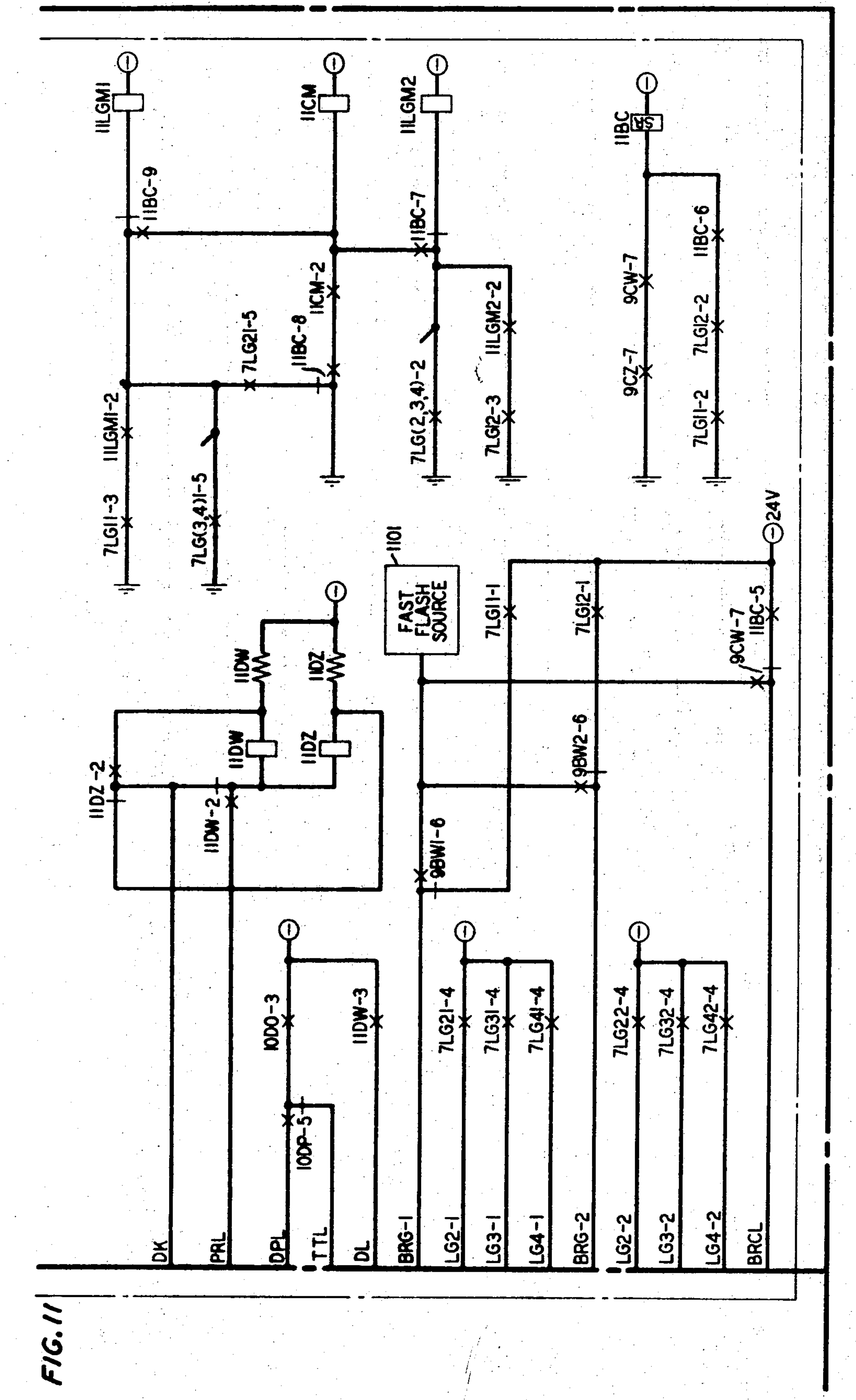

Turning now to FIG. 11, the operation of relay 11DW provides a battery on the DL lead through enabled make contact 11DW–3 to light the dial lamp on the attendant's console, FIG. 6. The attendant, upon observing that the dial lamp and the rotary dial lamp DP are lighted, proceeds to use the rotary dial 606 in the well known manner to generate the station digits of the called party. Operation of the rotary dial causes the transmission of dial pulses to the controller circuit, FIG. 10, via leads PL and D. These pulses are conveyed over leads PL and D to the trunk interface circuit TI0, via enabled make contacts 10DP–2, 10DP–3, 8D2–2 and 8D2–3, thereby operating relays 21PL and 21D in the interface circuit, FIG. 21, in an obvious manner. Accordingly, operation of these two relays cause the dial pulses to be repeated in the well known manner through the switching network over the M signaling lead to trunk TO. Upon completion of dialing, the attendant reoperates the dial key thereby extending a ground over the DK lead, FIG. 5, to the controller circuit, FIG. 11, causing relay 11DW to release in an obvious manner. When the attendant releases the dial key, ground is removed from lead DK, thus removing the operate path from relay 11DZ. Relays 11DW and 11DZ, releasing, cause the release of relay 8D2 which in turn causes the release of relays 10DP and 10D0. Relay 10DP, releasing, extinguishes the dial light and the rotary dial light DP and also opens the dial path from the attendant's console to trunk interface circuit TI0. Release of relay 10D0 allows for the subsequent operation of relay 7K0 whenever necessary for the connection of additional circuits to the link. It should be noted at this point that the operation of relays 21D and 21PL during the dialing interval removes battery from the M lead, FIG. 21, thereby causing the release of relay 21E in the interface circuit.

2.052 Called Party Answers

Referring again to FIG. 21, a ground reappearing on lead E, signifying, in the well-known manner, that the called party has answered, operates relay 21E thus again providing a source of steady potential for signal lamp TO on the console via operated make contacts 21CT–5 and 21E–2. Upon answering, the called party is connected through to the conference link through inductors 21T and 21R in circuit TIO, via leads TTA, TRA, RTA and RRA to the main horizontal communications bus 1301, FIG. 13, of the link 1300 to talk-back amplifier TB0, FIG. 20. Communication is then possible from the transmitter of the connected trunk over leads RTA and RRA and the main conference link 1301 via transmit pair 1303 through amplifiers 204 and 203 in the talk-back amplifier TB0, FIG. 20, and to the receive pair 222 of the line switch O, FIG. 22. Return communication is possible from the transmit pair 221 of the line switch, through amplifier 201 of talk-back amplifier TB0, FIG. 20, to the main horizontal receive bus 1304 of trunk switch O, crosspoint T0–02 via leads TTA and TRA, through the trunk interface circuit TIO, FIG. 21, to the receiver of the connected trunk.

Summarizing at this point, trunk TO is connected in two-way conference via main horizontal link 1301 and talk-back amplifier TB0 with stations S0, S1 and S2. If so desired, the attendant may remain on the connection with both transmit and receive capability. At this point it should be noted that the only relays operated, in addition to the hold magnets associated with the conferenced circuits, are the link select relays 10LS0 and 10LSA0 which allow the attendant access to the conference.

2.06 Establishment of Trunk Conference

Assume now that the attendant is asked to add a second trunk to the conference which already includes stations S0, S1, S2 and trunk TO. Since, as has been discussed hereinbefore, transmission requirements prohibit the paralleling of trunk circuits (as was done with local stations), additional trunk circuits may not be added in the same manner as were line circuits. Therefore, upon ascertaining that a second trunk, in this case trunk T7, is to be added to an existing conference, the attendant momentarily depresses a bridge key, such as key BR1, FIG. 5. Operation of key BR1 at the attendant's console provides a ground on lead BR1 to the controller circuit, FIG. 9, and via normal break contact 9CW–1 to battery through the winding of relay 9BW1, resistors BW1 and enabled make contact 10LSA0–1, thus operating relay 9BW1. Ground on the BR1 lead prevents relay 9BZ1 from operating, via released contacts 9CW–1 and 9BZ1–3 and the resistance battery side of the winding of relay 9BZ1. Accordingly, the operation of relay 9BW1 extends a source of fast-flash 1101, FIG. 11, via enabled make contact 9BW1–6 and lead BRG–1 to the console, FIG. 5, thereby flashing lamp BRG–1. The attendant is thus given a visual indication that conference bridge CB1 is in the process of being inserted into a communication path.

Turning now to FIG. 8, the operation of relay 9BW1 enables the operation of relay 8BS from ground via normal break contact 9BZ1–2 and operated make contact 9BW1–1 to battery, through the winding of relay 8BS. Operation of relay 8BS causes the operation of relay 8SW0 from ground via enabled make contact 8BS–12 to battery, through the winding of relay 8SW0. The enabling of relay 9BW1 also enables the operation of relay 8V0 from ground through released break contact 9BZ1–5 and enabled make contact 9BW1–5 to battery, through the winding of relay 8V0. The enabling of relays 8V0 and 8SW0 provides an operate path, as previously set forth, for relay 7K0.

Referring now to FIG. 7, operation of relay 7K0 extends ground over lead LS0 via enabled make contacts 7K0–2, 8SW0–2, 8BS–1 and 10LS0–2 to trunk switch O, FIG. 13, select magnet 13SM0. The enabling of select magnet 13SM0 provides a ground on lead SM0 from the trunk switch at FIG. 13 to the controller circuit, FIG. 8 and through enabled make contacts 7KC–2, 8SW0–5 and 8V0–3 therein to lead O0 and then via enabled make contact 7KA0–1 and lead H0 to hold magnet 13H0 on trunk switch O. The other side of the winding of hold magnet 13H0 is connected to the conference bridge circuit CB1, FIG. 14, to battery via normal break contact 14RL–1. Accordingly, the enabling of hold magnet 13H0 closes crosspoints T0–00 on the trunk switch, thus connecting trunk conference bridge CB1, port 1, to the main horizontal conference link 1301 via leads TTA, TRA, RTA and RRA. In addition leads TTB, TRB, RTB and RRB from conference bridge CB1, port 2, are similarly connected to the subsidiary link 1302 of the same horizontal multiple 1300. Operation of hold magnet 13H0 extends ground via enabled make contact 13H0–1, FIG. 13, to the winding of relay 14CT, FIG. 14. Accordingly, the operation of relay 14CT causes the transmit termination resistor 14CT to be removed from the communication path via enabled break contact 14CT–1. Upon the closing of crosspoints T0–00, battery is extended from FIG. 8 via lead L0 to FIG. 13 and through the crosspoint to lead PU0, thereby illuminating the PB1 lamp, FIG. 5, as an indication to the attendant that conference bridge BR1 is connected to the selected link.

Summarizing at this point, it can be seen that crosspoints T0–00 are operated connecting port 1 of conference bridge CB1 to the main communication bus 1301 of conference link O, while crosspoints T0–00 similarly connect port 2 of conference CB1 to the subsidiary bus 1302 of the same communication link. In addition, as set forth in subsection 2.05, it will be remembered that trunk TO is also connected via leads TTA, TRA, RTA and RRA from trunk interface circuit TIO, FIG. 21, via crosspoints TO–02 to the main horizontal bus 1301 of conference link O.

Figure 14:
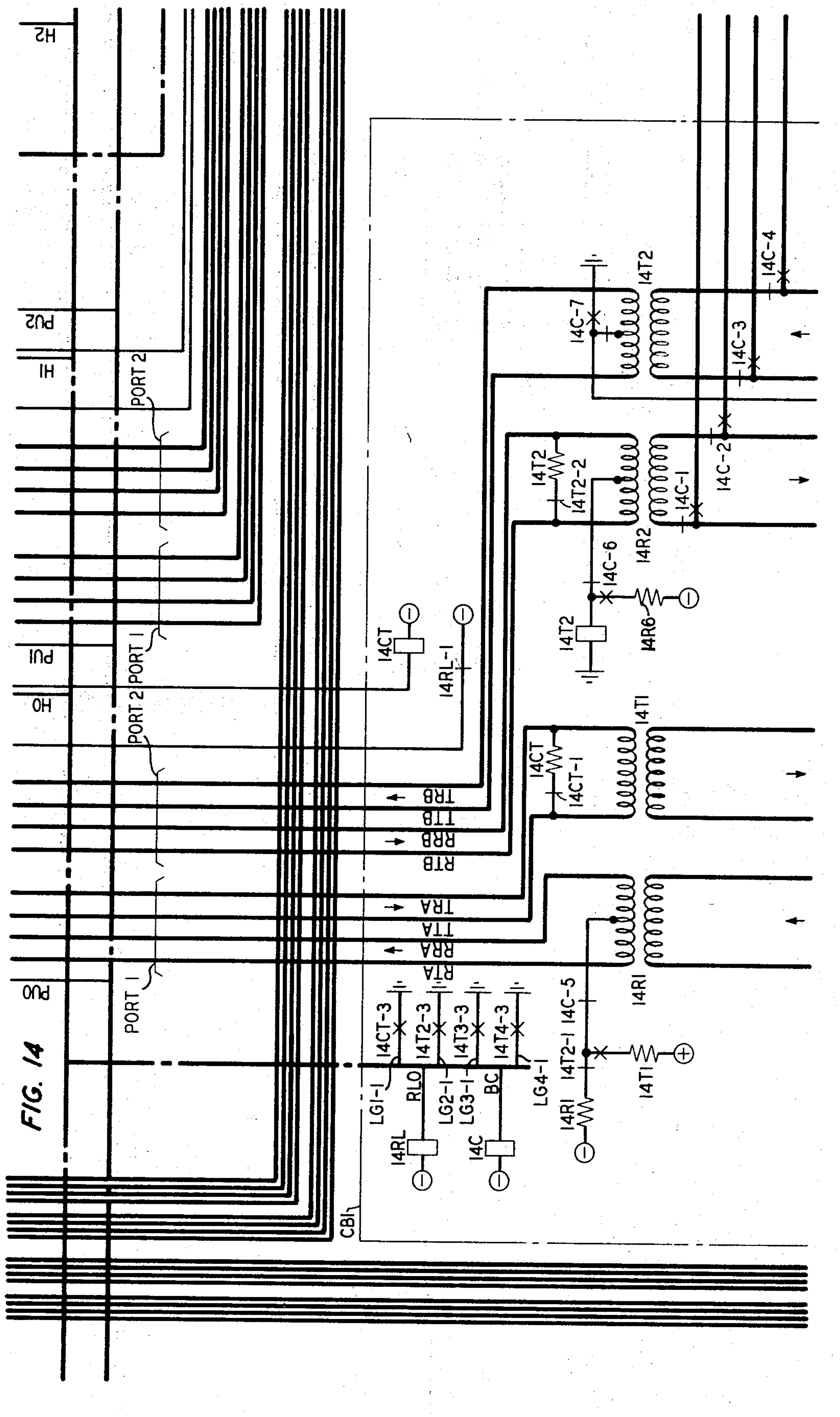

Upon simultaneous connection of conference bridge CB1 and trunk interface circuit TIO to the same main bus 1301 of communication link O, ground is extended from conference bridge CB1, FIG. 14, via the winding of relay 14T2, normal break contact 14C–6, through the 14R2 inductor over leads RRB and RTB, through crosspoint TO–00 to the subsidiary horizontal bus 1305 to crosspoints TO–02 and to the trunk interface circuit TIO, FIG. 21, over leads RTB and RRB, through inductor 21B via released break contact 21B–1 to positive potential through the winding of relay 21B. Accordingly, relay 21B thereby operates and locks through its own operated make contact 21B–1 to ground through released break contact 21RL–3. Operation of relay 21B splits the communication path away from leads TTA, TRA, RTA, and RRB and transfers communication to leads TTB, TRB, RTB and RRB, through enabled make contacts 21B–2, 21B–3, 21B–4 and 21B–5 in trunk interface circuit LIO, FIG. 21. It is therefore apparent at this point that trunk interface circuit TIO has been split away from main horizontal communications bus 1301 and terminated instead on the subsidiary bus 1302 of the associated horizontal multiple 1300.

It should be noted that the splitting of trunk interface circuit TIO from the main horizontal multiple will also remove the positive potential from the main transmit pair 1303 thus causing the release of relays 20TC0 and 20LBY0. However, connection of conference bridge CB1 to the main horizontal will cause a negative battery to be extended from FIG. 14 via resistor 14R1, released break contacts 14T2–1 and 14C–5, inductor 14R1, the main transmit pair 1303 to the winding of relay 20LBY0 through inductor 20R and forward biased diode LBY0 to the winding of relay 20LBY0. Accordingly, the operation of relay 20LBY0 extends operating potential to link selection lamp LS0 in the manner previously detailed. In the event that a conference bridge becomes associated with a link prior to the connection of a trunk to the same link, the associated link select lamp on the console would be illuminated. However, as will be more fully appreciated hereinafter, the negative potential from the bridge circuit would not operate any of the 20TC(0–9) relays, thus indicating to the attendant that a trunk has not been associated with the conference bridge, port 2.

Turning now to FIG. 14, relay 14T2 in conference bridge CB1 operates in conjunction with relay 21B in trunk interface TIO, FIG. 21 over the earlier described path. The operation of relay 14T2 signifies the attachment of a trunk to port 2 of the conference bridge circuit and removes the transmit termination resistor 14T2 via enabled break contact 14T2-2. The operation of relay 14T2 removes negative battery from leads RTA and RRA and substitutes positive potential over enabled make contact 14T2-1 and resistor 14T1, released break contact 14C-5 and via the 14R1 inductor to the main communication bus 1301. This positive potential is extended via the main horizontal link to talk-back amplifier TB0, FIG. 20, and thereby operates relay 20TCO in the same manner as previously set forth in subsection 2.05 for trunk interface circuit TIO. The operation of relay 14T2 in the conference bridge also extends a ground via enabled make contact 14T2-3 over lead LG2-1 to the control circuit, FIG. 7, to battery through the winding of relay 7LG2, thereby operating relay 7LG21. Accordingly, operation of relay 7LG21 illuminates lamp LG2 on the console, FIG. 5, via battery on lead LG2-1 from the controller circuit, FIG. 11, and enabled make contact 7LG21-4. Lamp LG2 lighted signifies to the attendant the connection of a trunk circuit to port 2 of the conference bridge, CB1.

It should be noted that the 7LG- relays, such as relay 7LG21, are arranged to be operated only when a trunk circuit is connected to their respective ports. In addition to providing a lamp display via their respective contacts (shown in FIG. 11) as set forth above, these relays serve an additional function, namely, the automatic release of the bridge circuits when all trunks have released from the bridge. In order to accomplish this, the 7LG- relays operate in conjunction with the 11LGM1 and 11LGM2 relays which serve as memory relays for their respective bridges. These relays are arranged to lock operated upon the connection of a trunk to any bridge port. This circuitry functions in an obvious manner and is shown in FIG. 11. Relay 11CM is provided for the situation, as will become more apparent hereinafter, when it is desired to combine the conference bridge circuits to form a single conference.

Referring again to FIGS. 7, 8 and 9 as the attendant release key BR1, ground is removed from the BR1 lead, FIG. 9, thus operating relay 9BZ1. Accordingly, the operation of relay 9BZ1 removes the operate path from relays 8BS and 8V0 thereby enabling the release of these relays, together with the release of relays 8SW0, 7K0, 7KC and 7KAO and select magnet 13SM0. The release of relay 8BS controls the subsequent establishment, as will be apparent from the description contained hereinafter, of a communication path to ports 3 and 4 of the communication bridge CB1 for any trunk circuit connected to horizontal 10 of either trunk switch.

Summarizing at this point, communication is possible from trunk circuit TO through trunk interface circuit TI0, through the subsidiary appearance of the interface circuit to the subsidiary bus of horizontal multiple 1300, and via the subsidiary bus to port 2 of the conference bridge circuit CB1 and then through the conference bridge, in the manner to be more fully set forth hereinafter, to port 1 and then via the main horizontal communication bus of horizontal multiple 1300 to talk-back amplifier TB0, which, it will be remembered, is connected in conference fashion to the stations S0, S1 and S2.

2.061 Connection of Trunk Circuits T7 and T8 to the Trunk Conference Link

As previously discussed, trunks T7 and T8 are to be added in conference fashion to the established communication bus. Since, as has been reviewed previously, only one trunk circuit can be connected directly to the same link at the same time and trunk TO has already been connected to link O, all additional trunks to the conference must have a conference bridge circuit inserted into the connection between the trunk and the link.

At this point, it should be noted that relay 20TC0 operated prevents the reselection of link O on the trunk switch field while any trunk remains connected directly to link O or to port 1 of conference bridge CB1. This feature is accomplished by enabled break contact 20TC0-2, FIG. 7, which prevents the operation of a link select magnet, (SM0-SM9) via leads LS (0-9) when a trunk is currently connected to the associated link.

Turning now to FIGS. 3, 7 and 8, the attendant operates key T7, FIG. 3, which extends ground via leads SW0 and PV9 to the controller circuit, FIG. 8, thereby operating relays 8SW0 and 8V9 in an obvious manner. As has been set forth previously, operation of these two relays cause the operation of relays 7K0 and 7KA0 via the appropriate contacts of the relay chain. The operation of relays 7K0 and 8SW0 at this time would normally extend battery through operated make contact 7K0-2 and 8SW0-2, enabled released break contact 8BS-11, to the link select magnet, through break contacts 20TC (0-9). However, as previously discussed, relay 20TC0 is operated at this time, thereby preventing the extension of battery over lead LS0. A battery is extended, however, via operated make contacts 7K0-2, 8SW0-2, released break contact 8BS-11, operated make contacts 9BZ1-1 and 7LG21-1 and released break contact 7BF1-1 operating relay 7LS10. Accordingly, the select magnets 12SM10 and 16SM10 on trunk switches O and 1 are operated from battery, over lead LS10 via operated make contact 7LS10-2, FIG. 7. The operation of select magnet 12SM10 extends a ground through off-normal contact 1 over lead SM10, FIG. 12, on the trunk switch O to the controller, FIG. 8, to hold magnet 17H9, via lead H9 through enabled make contacts 7KC-2, 8SW0-5, 8V9-3 and 7Ka0-3. Hold magnet 17H9 operates to battery via the HB lead to trunk interface circuit TI17, FIG. 24, thereby closing crosspoints T0-109, FIG. 16. Accordingly, a battery is extended via enabled make contact 7LS10-3, FIG. 7, in the manner previously discussed via lead L10, FIG. 12, through the crosspoints and via lead PU9, FIG. 17, to the console, FIG. 3, thereby lighting the corresponding lamp PU7.

Figure 12:
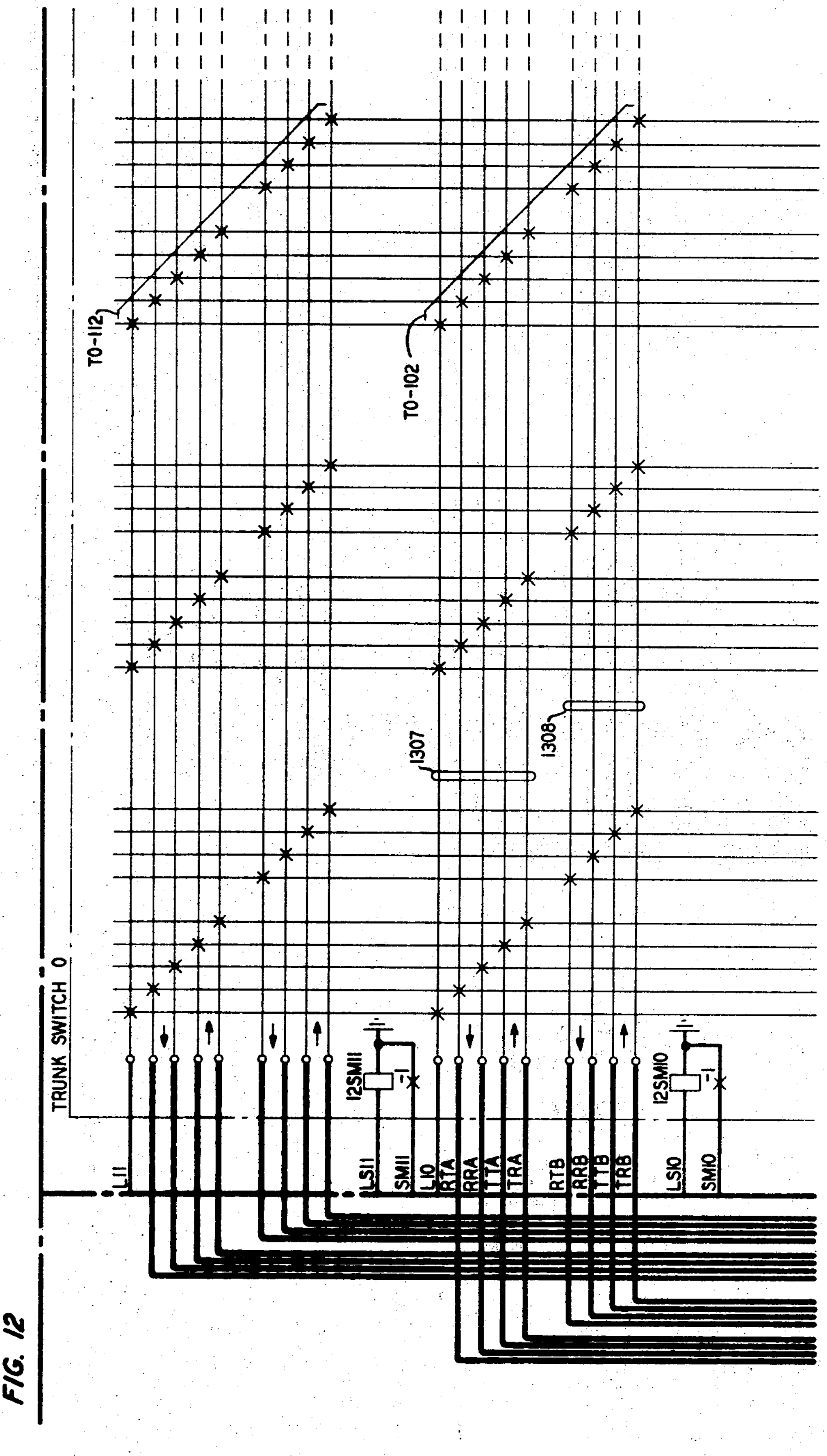
Figure 15:
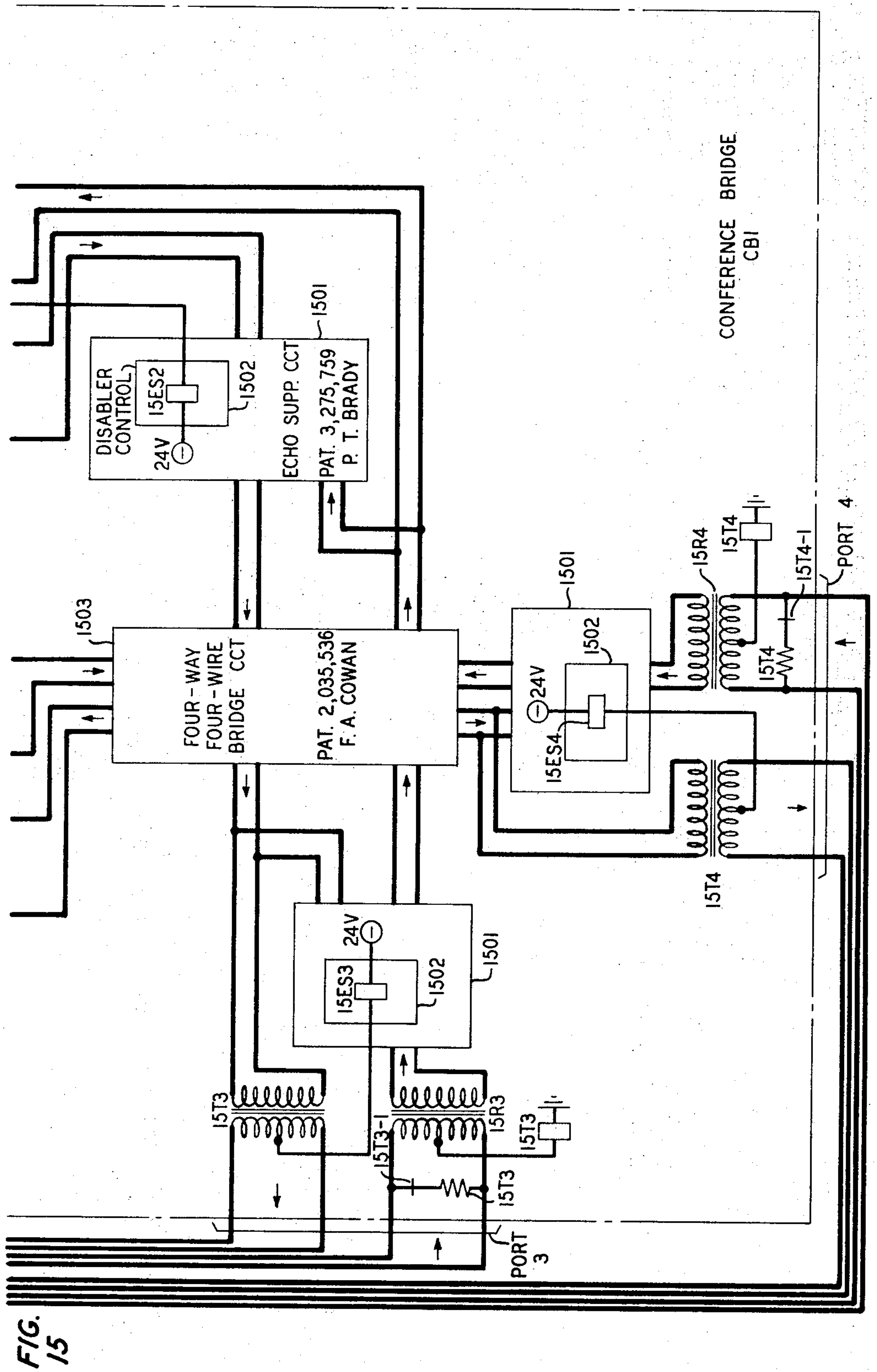
Figure 16:
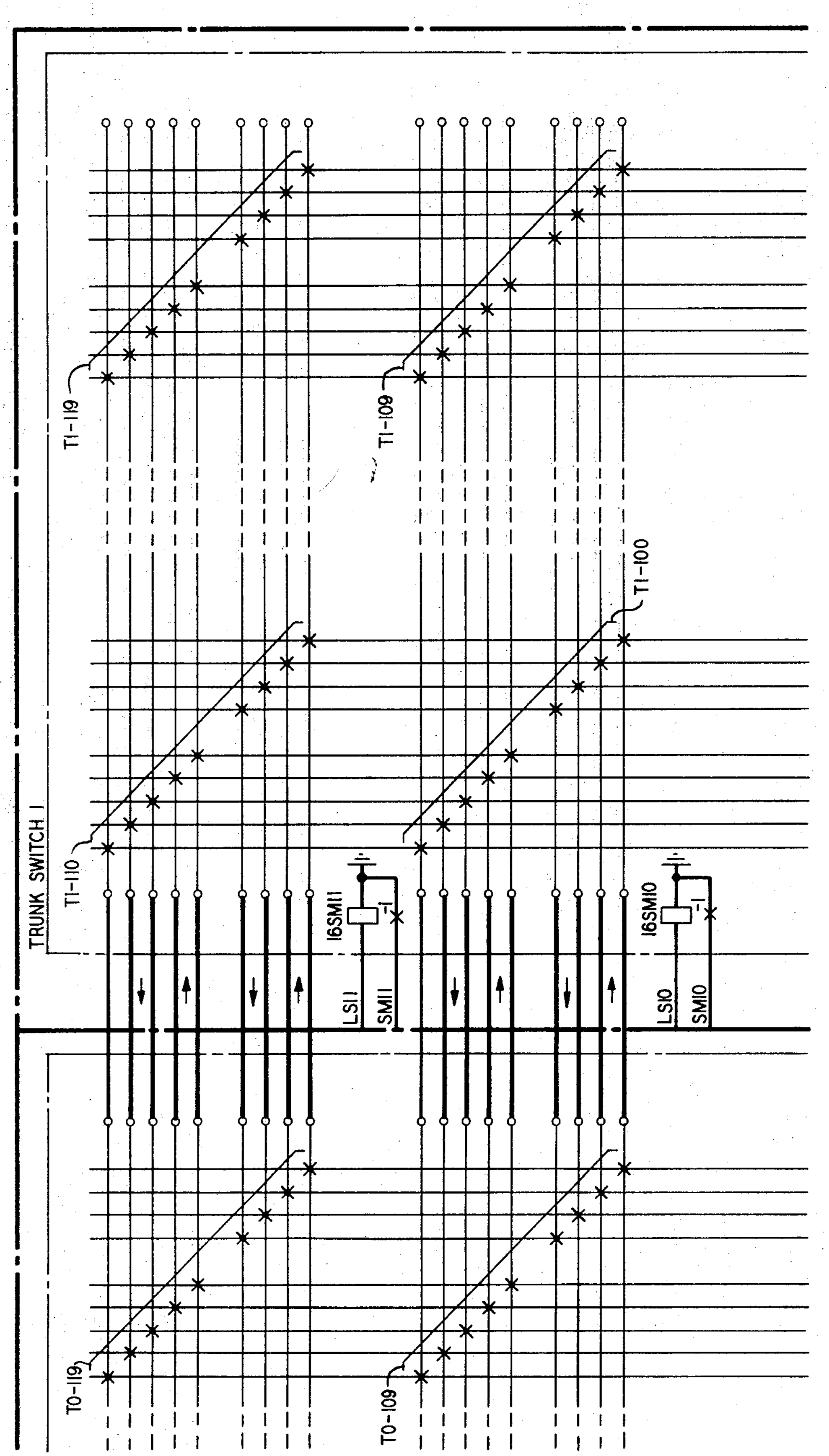

Turning now to FIG. 16, leads RTA, RRA, TTA and TRA from FIG. 21 are extended through operated crosspoints T0-109, via auxiliary horizontal communication bus 1307, FIG. 12, to port 4 shown in FIG. 15 of conference bridge CB1. Leads RTB, RRB, TTB and TRB are also extended through operated crosspoints T0-109 and the auxiliary subsidiary communication bus 1308 port 3 of the conference bridge. Accordingly, ground is thereby extended from port 3 of conference bridge CB1, circuit. 15, via relay 15T3, inductor 15R3, over leads RTB and RRB, to the auxiliary subsidiary horizontal bus 1308 through crosspoint T0-109, to the connected trunk, T7, FIG. 24 (not detailed, but the same as FIG. 21) over leads RTB and RRB and inductor 21B, via released break contact 21B-1, to battery, through the winding of relay 21B. Relay 21B operates in conjunction with the operation of relay 15T3 in conference bridge CB1 via the above described operate path. Accordingly, the operation of relay 21B transfers the communication path of trunk interface circuit T7 from the main communication bus 1307, FIG. 12, to the subsidiary bus 1308. The operation of relay 15T3 removes the transmit termination resistor 15T3 via enabled break contact 15T3-1 thereby placing trunk T7 in communication with the conference bridge CB1, FIG. 15, via the subsidiary horizontal multiple of link 10 and port 3 of the conferences bridge circuit. Port 4 of the conference bridge remains associated with the main horizontal 1307 of link 10 and at this point is unterminated with relay 15T4 normal and a shunt resistor 15T4 across the input.

The attendant, upon ascertaining that trunk T7 is connected to the conference bridge, thereupon momentarily depresses key T8. Accordingly, the operation of key T8, FIG. 3, extends ground to the controller circuit via leads PV0 and SW1, thereby operating crosspoints T1-100 in trunk switch 1, FIG. 16, in the same manner as previously set forth for trunk T7. It should be noted at this point that trunk T8, although connected to the same horizontal multiple 1307 as was trunk T7, is prevented from switching to its auxiliary appearance by the voltage divider effect of positive battery from inductor 21R and ground from relay 15T3 on the subsidiary horizontal 1308. The presence of positive potential prevents the operation of the 21B relay in trunk interface circuit T18, thereby inhibiting the transfer of the communication leads from the main to the subsidiary appearance. Connection of trunk T8 to link 10 causes the operation of relay 15T4 in port 4 of conference bridge CB1 thereby removing the shunt resistor and providing a two-way communication path for trunk T8.

Summarizing at this point, each of trunks T7 and T8 have been connected individually through separate communication busses, consisting of the subsidiary 1308 and the main 1307 horizontal multiples of link 10, to ports 3 and 4, respectively, of conference bridge CB1. Communication is then possible among all the connected trunks via the conference bridge and also among all the connected lines which are associated with the selected link LSO.

2.07 Inhibiting Echo Suppression on Preselected Trunks

Referring now to FIGS. 14 and 15, as summarized above, trunks TO, T7 and T8 are connected to the ports 2, 3 and 4, respectively, of conference bridge CB1 while port 1 of the conference bridge is connected to the main communication bus 1301 of link 1300. Communication among the connected trunks is accomplished when the transmit pairs and the receive pairs are each terminated in respective ports of the conference bridge circuit. Contained within the conference circuit is a conventional four-way, four-wire bridge circuit, such as is disclosed in F. A. Cowan, U.S. Pat. No. 2,035,536, dated Mar. 31, 1936, the operation of which is now well known in the art. Individually associated with ports 2, 3 and 4 of each conference bridge circuit there is provided an echo suppression circuit, such as is disclosed in P. T. Brady, U.S. Pat. No. 3,275,759, issued Sept. 27, 1966, which prevents the return of echoes over the receive pair of each four-wire circuit. Reference can be made to either of the above mentioned patents for a more detailed discussion of conference connections utilizing echo suppression circuitry, if so desired. The echo suppression circuitry in each leg has been arranged such that so long as the corresponding relay 15ES- remains in a normal condition the echoes will be suppressed. However, the operation of any relay 15ES- will inhibit the suppression circuitry in the associated leg. It should also be noted that the system described herein is not limited to a four-way bridge but in fact may employ a bridge with any number of desired terminations. In addition, it is also obvious that any number of conference bridge circuits could be utilized with the number dependent upon traffic considerations only.

Referring now to FIG. 21, each of the trunk interface circuits TIO through T117 is arranged with an ES terminal to which it is possible to connect a permanent ground or to connect a switched ground from an external source. In either event, a ground on the ES terminal of any trunk interface circuit, for example as shown on the ES terminal associated with circuit TIO, will be transmitted to the conference bridge, FIG. 15, via enabled contacts 21B–4 and 21B–5 via leads TRB and TTB, subsidiary receive pair 1306 and inductor 14T2 in the bridge circuit to relay 15ES2 in leg 2. Thus, upon connection of terminal 2 to a trunk interface circuit which is arranged with a ground on terminal ES the corresponding echo suppression relay 15ES- is enabled, thereby removing the echo suppression circuitry from the connection. In the illustrative embodiment, therefore, ground is extended from the ES terminal, FIG. 21, the 21T inductor, enabled make contact 21B–4 via lead TTB through the crossbar switch field to FIG. 14, inductor 14TR2, released break contact 14C–7, to battery via the winding of the 15ES2 relay. Accordingly, operation of the 15ES2 relay to inhibit the echo suppression circuitry associated with leg 2 from modifying the transmission over that leg and trunk circuit TO.

2.08 Attendant Released from the Connection

Figure 5:
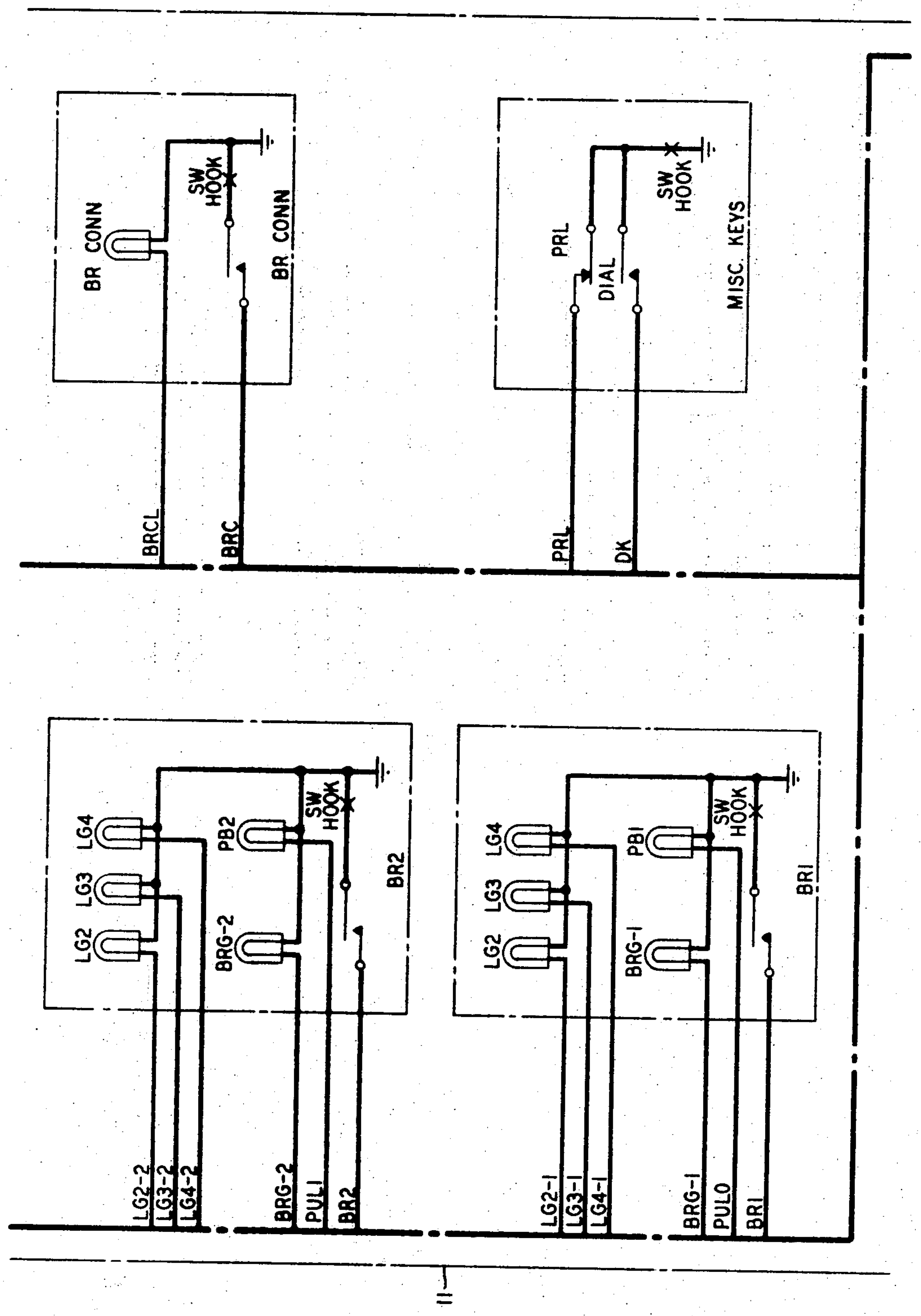

Referring now to FIGS. 5 and 10, as has been set forth previously, the attendant is connected to the established conference over leads RT, RR, TT and TR via the enabled make contacts of relay 10LSAO. The attendant may release from the connection by either operating the PRL key or by returning the handset to the switchhook. Upon the occurrence of either of these conditions ground is removed from lead PRL to the controller circuit, FIG. 10, removing the holding ground for relays LSO through LS9, thus releasing operated relay 10LSO. Accordingly, the release of relay 10LSO releases relay 10LSAO which in turn opens contacts 10LSAO–2, 10LSAO–3, 10LSAO–4 and 10LSAO–5, FIG. 10, thereby removing the attendant from the established conference. Relay 10LSAO releasing also extinguishes the connection lamps PU (0—29) which are associated with the individual stations by removing ground from the horizontal multiple of link 0 via lead LO from the controller circuit, FIG. 8, released make contact 10LSO–7. It should be pointed out at this point, that the attendant would also be removed in the manner to be more fully detailed hereinafter from the established conference by selecting any other link, LS1 through LS9, with the resultant transfer to the selected link.

2.09 Incoming Conference Request from a Trunk Circuit

Figure 24:
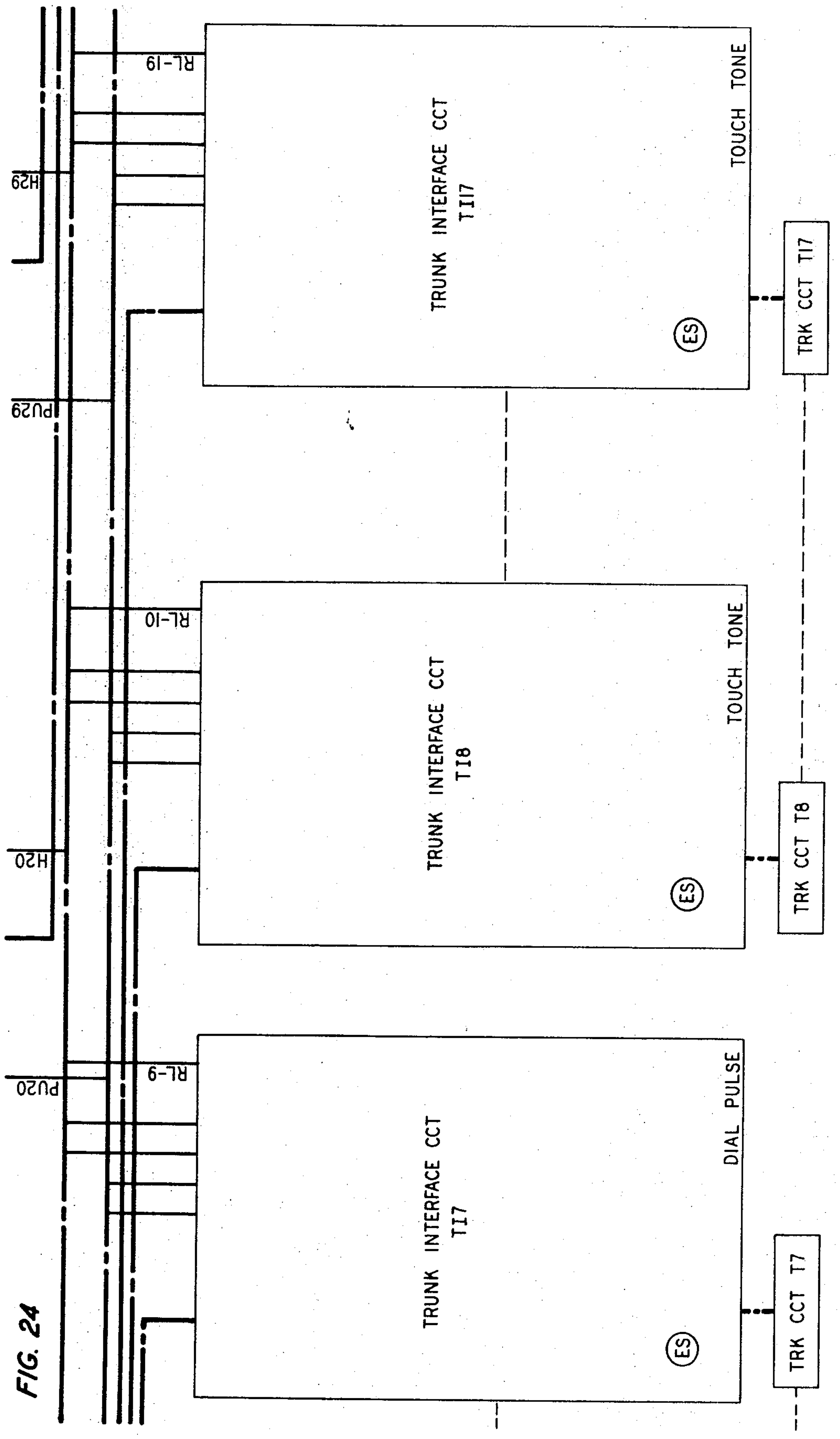

Referring now to FIG. 24, assume that a call is incoming to the system over trunk interface TI1 (not shown but similar to TIO, FIG. 21). In that event a ground would appear on lead E from the central office switching system, or from any other long distance connection, which would operate relay 21E in the obvious manner. Accordingly, operation of relay 21E causes the associated signal lamp at the attendant's console, in this case lamp T1, which is not shown but identical with lamp TO, FIG. 3, to flash via lead T1, enabled make contact 21E–2, released break contacts 21CT–5 and 21A–2 to a source of fast flash potential. At this time, the buzzer at the attendant's console, FIG. 6, also sounds via a battery on lead BZ from released break contacts 21CT–6 and 21A–1 and enabled make contact 21E–1. The attendant answers this call by first selecting an idle link. In this case lamp LSO would be illuminated, as set forth above, to show that link 0 is busy. The attendant then selects any other link key, such as link key LS9, FIG. 4. A ground then appears on lead LS9 which operates relay 10LS9 in the controller circuit, FIG. 10, in the same manner as heretofore set forth. Operation of relay 10 LS9 releases any other operated 10LSO to 10LS8 relay by operation of make contacts 10LS9–3 and 10LS9–4. Enabling of relay 10LS9 enables relay 10LSA9 which thereupon connects the attendant's handset with talkback amplifier TB9 FIG. 20. The attendant also momentarily depresses key T1, FIG. 3, (not shown but identical to key TO). Operation of key T1 places grounds on leads PV3 and SWO to the controller circuit, FIG. 8, which operate relays 8SWO and 8V3 in substantially the same manner as was set forth above for key TO. Operation of these two relays causes the operation of select magnets 13SM9 and 17SM9 corresponding to link 9 and hold magnet 13HM3 (not shown) corresponding to trunk T1 of trunk switch 0, thus closing the crosspoint TO–93 (not shown) on the main horizontal conference link 9 to trunk interface circuit TI1. Communication is then possible between the attendant position and trunk circuit T1 via the operated crosspoints and talkback amplifier TB9 in the same manner as previously set forth.

2.091 Establishment of a Second Trunk Conference

Upon ascertaining that a second trunk, in this case trunk T17, is to be added in conference fashion with trunk T1, the attendant momentarily depresses a bridge key associated with an idle bridge, such as bridge key BR2. Operation of key BR2 at the attendant's console, FIG. 5, provides a ground to the controller circuit, FIG. 9, over lead BR2 and operates relay 9BW2 and 9BZ2 in the same manner as was set forth in subsection 2.06 for relays 9BW1 and 9BZ1. As further detailed in subsection 2.06, select magnet 13SM9 and hold magnet 13H1 of trunk switch 0 operate to close crosspoint TO–91, thereby enabling conference bridge CB2 to have access through port 1 to the main horizontal communication bus of link 9 and through port 2 to the subsidiary communication bus of the same link.

Since, at this point, conference bridge CB2 is connected to the same main horizontal bus as is trunk circuit T1, trunk interface circuit TI1, FIG. 21, therefore transfers connection, as previously detailed in subsection 2.061, from its main appearance to its subsidiary appearance, thereby connecting leads TTB, TRB, RTB and RRB to the subsidiary horizontal of link 9. Conference bridge CB2 is thereby serially inserted between the selected trunk T1 and the main horizontal communication bus of link 9. The attendant can now add trunk T17 to the connection by momentarily operating the dial and T17 keys on the console, FIG. 3.

Accordingly, the operation of key T17 enables the operation of relays 8SW1 and 8V9 which in turn cause the operation of relays 7KO and 7KA1 in the same manner as heretofore set forth. As a result of these relays operating, relay 7LS11 also operates, in the manner set forth for relay 7LS10, which causes the operation of select magnets 12SM11 and 16SM11 on trunk switches 0 and 1 and further causes the operation of hold magnet 17H19, trunk switch 1, FIG. 17, thereby closing crosspoint T1–119 and enabling communication to take place between trunk T17 and the main horizontal communication bus of link 11 to port 4 of conference bridge CB2. As set out in detail in subsection 2.061, trunk interface circuit TI17 is thereupon transferred to port 3 via the subsidiary bus of link 11.

2.092 Attendant Dials

Operation of the dial key at the attendant's console, FIG. 5, extends a ground over lead DK to the controller circuit, FIG. 11, thereby operating relays 11DW and 11DZ in the same manner as set forth in subsection 2.051. Operation of relays 11DZ and 11DW enable the operation of relay 8D19 which corresponds to trunk T17. Ground is thereby extended through enabled make contact 8D19–2 from terminal D19, FIG. 10, to terminal TT operating relay 10DO. At this point, it should be noted that since trunk T17 is arranged as a Touch-Tone trunk, there is a strap between terminal D19 and terminal TT and not between terminals D19 and terminal DP as would be the case for a dial pulse trunk.

Returning now to FIG. 10, operation of relay 10DO extends a ground through released break contact 10DP–4, enabled make contact 10DO–2, via lead TTD3 to the Touch-Tone dial 605, FIG. 6. At the same time, battery is extended from controller, FIG. 11, via enabled make contact 10DO–3, released break contact 10DP–5 and via lead TTL to the attendant's console to illuminate the Touch-Tone TT lamp. Battery is extended through make contact 11DW–3, FIG. 11, to also illuminate the dial lamp 607 at the attendant's console via lead DL. The attendant then uses the Touch-Tone Tone dial 605 to key in the station digits of the desired party. This information is conveyed in the conventional manner over leads TTD1 and TTD2 to controller circuit, FIG. 10, via released break contacts 10DP–2 and 10DP–3 and enabled make contacts 8D19–2 and 8D19–3 and over the D and PL leads to trunk T17, FIG. 24. Trunk interface circuit T17 thereupon transmits the signals forward through the switching network in order to establish connection to the called party as previously described. Reoperation of the dial key by the attendant releases relays 11DW and 11DZ in the manner previously detailed, thereby removing operate potential from the dial lamp, the Touch-Tone TT lamp and the Touch-Tone dial. Upon the called party answering, ground is extended over the signaling lead thereby operating relay 21E in the trunk interface circuit TI17, FIG. 24, and placing trunk T17 in communication with trunk circuit TI via conference bridge CB2 in the same manner as set forth in section 2.07.

2.093 Establishment of Second Line Conference

Assume now that the attendant is requested to add stations S3, S4 and S5, to the existing conference. Upon ascertaining that these stations are idle by observing their associated signal lamps on the console, the attendant momentarily depresses, in turn, each of the keys S3, S4 and S5. Operation of these keys releases the associated stations from any conference link with which they may have previously been associated and, as set forth in subsection 2.04, connects each of the selected lines in turn to conference link L9 in common conference bus fashion.

Summarizing at this point, communication is possible among any of the connected trunks and any of the connected lines S3, S4 and S5 via their respective transmit or receive pairs, through the talk-back amplifier TB9, over the main communication bus of link 9 of trunk switches 0 and 1 to the first port of conference bridge CB2 and via ports 2 and 3 to the connected trunks T1 and T17. Echo suppression has been added on each of the trunk circuits T1 and T17 since a ground is not present on the ES terminal associated with these trunk circuits.

2.10 Attendant is Recalled by the First Conference

Referring now to FIGS. 21 and 23, the momentary operation of the switchhook at any one of the associated line or trunk stations, such as station SO, will enable relay 23LR in the associated line interface circuit to release momentarily. Relay 23LR releasing extends a ground through enabled make contacts 23A–4, 23CT–4 and 23A–3, released break contact 23LR–3, to battery, through the winding of relay 23RT thereby operating the relay. Accordingly, relay 23RT locks operated to itself through enabled make contact 23RT–3 from the operated hold magnet of the associated crosspoint. Operation of relay 23RT also enables a source of fast-flash potential via enabled make contacts 23LR–1, 23RT–1 and 23A–1 over lead SLO to the attendant console, FIG. 4, thereby flashing lamp SO.

The attendant, upon ascertaining that trunk SO wishes assistance, reoperates link key LSO and station key SO. Operation enabled these keys releases, as set forth in subsection 2.03, the associated hold magnet, in this case 22HO, which thereupon releases relay 23RT in the line interface circuit LIO. Crosspoint contacts released 00 are now closed by the reoperating select magnet 22SMO attendant's hold magnet 22HO in line switch 0 in the same manner as set forth in subsection 2.02 and 2.03. At this point, attendant's attendant has been released from link L9 and reestablished Touch-Tone conference on link LO and is thereby in communication with stations SO, S1 and S2 and trunks TO, T7 and T8 via talk-back amplifier TBO and conference bridge CB1.

2.11 Interconnection of First and Second Conference Links

Assume now that for some reason it is desired that conference links L1 and L9 are to be connected together to form a single conference consisting of stations SO, S1, S2, S4 and S5, as well as trunks TO, T1, T7, T8 and T17. In order to accomplish this interconnection, the attendant operates Key Br-Conn at the attendant's console, FIG. 5, which extends a ground over lead BRC to the controller circuit FIG. 9, thereby operating relay 9CW via released break contact 9CW–4, through the winding of relay 9CW, to battery, through resistor CW and operated make contact 10LSAO–1. Accordingly, relay 9CW operating extends ground through released break contacts 9SO2–2 and 9CZ–4, enabled make contact 9CW–6, released break contact 9CZ–2 to the resistance battery side of the 9CZ relay winding, thereby preventing the operation of relay 9CZ at this time. Ground is also extended via released break contact 9CZ–1, enabled make contact 9CW–2 and released break contact 9SO1–1 to shunt down relay 9BZ1 in an obvious manner and to operate relay 9BW1 via released break contacts 9BZ1–3 and 9BW1–3 also in an obvious manner.

Turning now to FIG. 8, the operation of relay 9BW1 with relay 9BZ1 remaining normal causes the operation of relay 8VO in a straightforward manner, thereby operating relays 7KO, 7KAO, and releasing and reoperating select magnet 13SMO and the hold magnet 13HO, in the same manner as previously detailed. Accordingly, operation of relay 7KAO extends a ground through released break contact 9CZ–3, FIG. 9, enabled make contacts 9CW–5 and 7KAO–4, released break contact 9AD–2 to the winding of relay 9SO1. Relay 9SO1, being a slow operate relay, always operates after hold magnet 13HO, thereby signifying the closure of crosspoint TO–00 and providing for the subsequent closure of crosspoint TO–01. Accordingly, the operation of relay 9SO1 removes the shunt path from relay 9BZ1. Relay 9BZ1 operating, removes the operate path from relay 8VO, FIG. 8, thereby enabling the release of relay 8VO and the operated relays 7KO, 7KC, 7KAO, 8BS and 8SAO in addition to the select magnet 13SMO. Relay 7KC releasing provides an operate path for relay 9AD via enabled make contact 9SO1–2, released make contacts 7KC–3 and 7KAO-4, operated make contact 9CW-5 and released break contact 9CZ-3.

Upon the operation of relay 9AD, ground, which had been holding relay 9BZ1 normal, is extended via enabled make contacts 9SO1-1 and 9AD-3 and released break contact 9SO2-1 to hold relay 9BZ2 unoperated and to operate relay 9BW2 via released break contacts 9BZ2-3 and 9BW2-3. Accordingly, the operation of relay 9BW2 with relay 9BZ2 normal operates relay 8V1, and relays 7KO, 7KAO, select magnet 13SMO in the same manner as previously detailed. Relay 8V1 operating causes the operation of hold magnet 13H1, as previously described. The operation of relay 7KAO provides an operate path for slow operate relay 9SO2 via operated make contacts 9AO-2, 7KAO-4 and 9CW-5 and released break contact 9CZ-3 to ground. Accordingly, relay 9SO2 operates and removes the shunt grounds from relays 9BZ2 and 9CZ, via enabled break contacts 9SO2-1, 9SO2-2, respectively, thereby allowing relays 9BZ2 and 9CZ to operate. Accordingly, the operation of relay 9CZ provides an operate path for relay 11BC, FIG. 11, via an obvious circuit.

The operation of relay 11BC provides a visual indication to the attendant that the bridges are connected together by illuminating lamp BrConn, FIG. 5, via lead BRCL from FIG. 11 and enabled make contact 9CW-7 to a source of fast flash 1101 potential. The operation of relay 11BC also provides, in a manner that will be more fully detailed hereinafter, a circuit for the automatic release of each bridge circuit, in turn, upon the release of the link connection.

As has been previously detailed, prior to the enabling of hold magnets 13HO and 13H1, each of the respective circuits, in this case CB1 and CB2, are released from their existing communication link and reconnected through the now enabled crosspoints to the new selected link. In this case, conference bridge CB1 has remained with link 0, while conference bridge CB2 has been transferred from link 9 to link 0.

Figure 9:
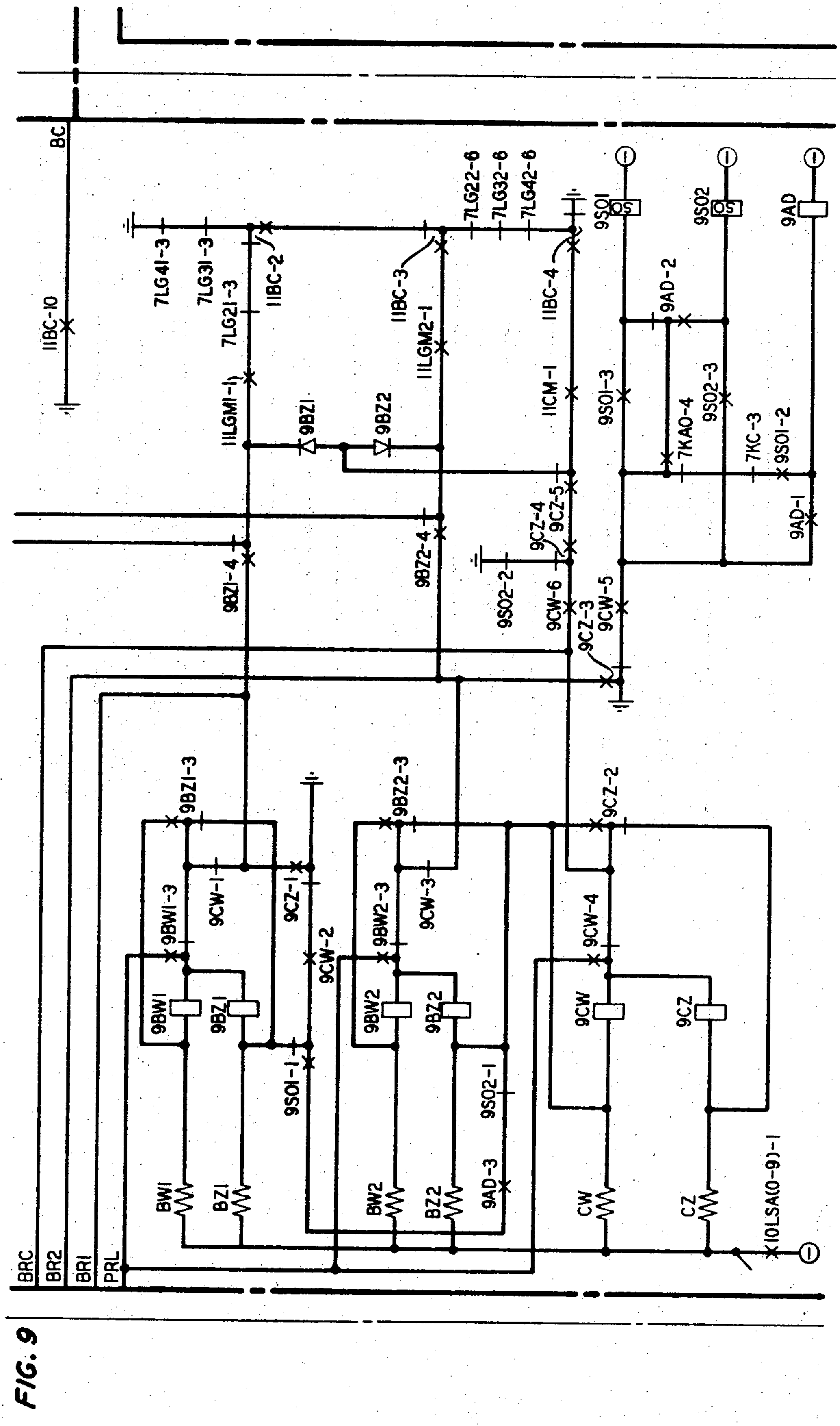
Figure 18:
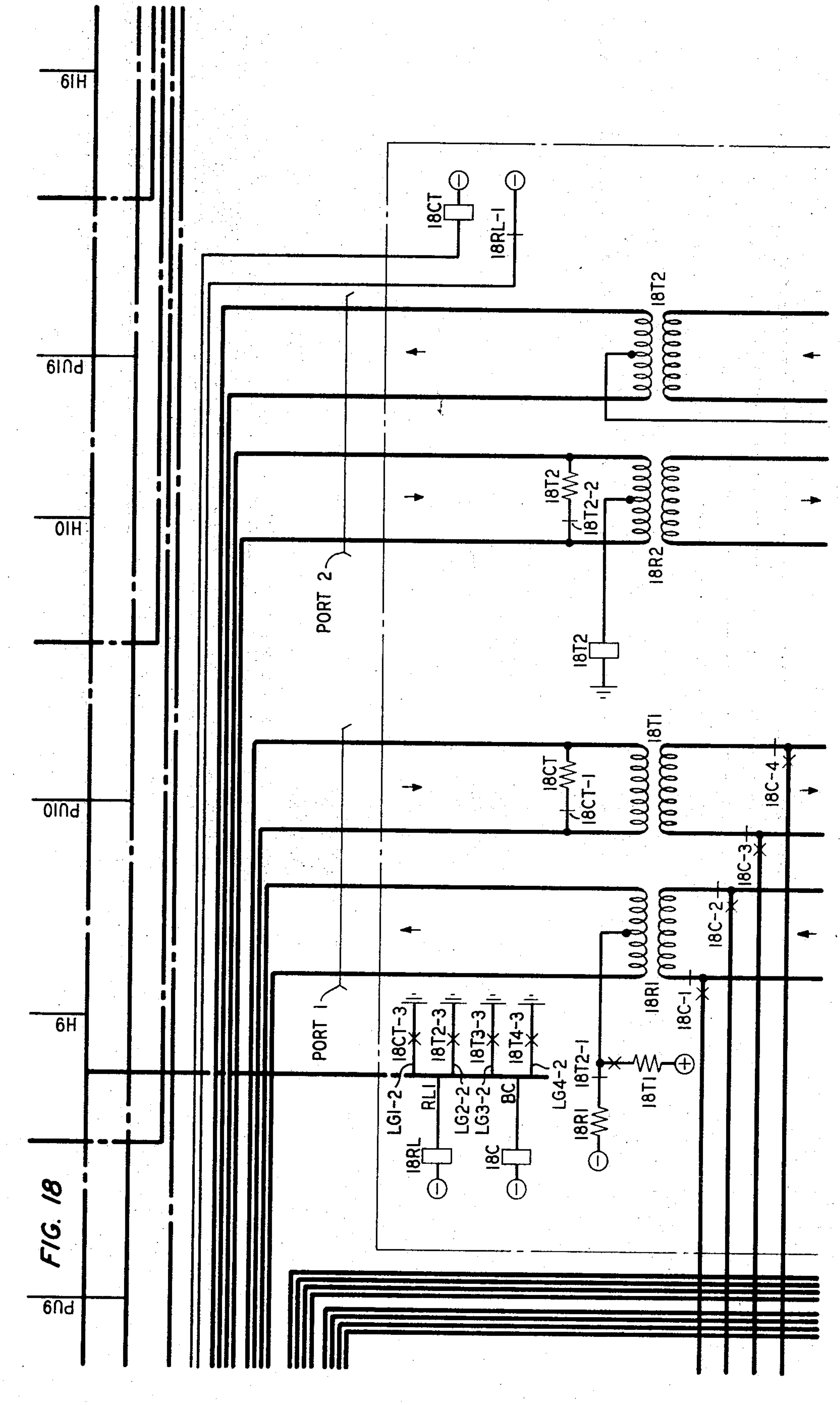
Figure 19:
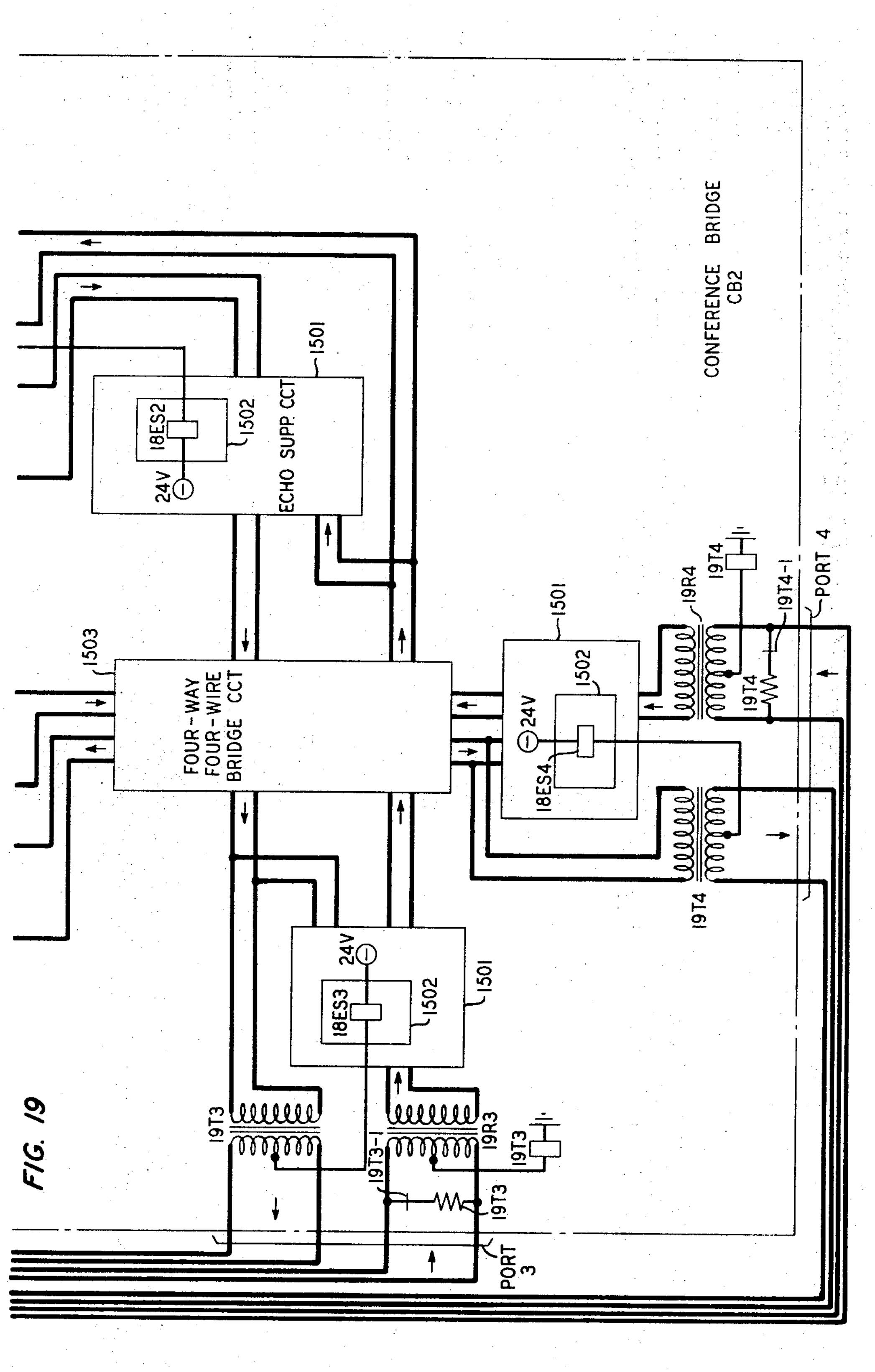

Referring now to FIGS. 14 and 18, relays 14C and 18C operate from a ground which is extended from controller circuit, FIG. 9, via lead BC and enabled make contact 11BC-10. Accordingly, the operation of relay 14C in the conference circuit CB1 transfers communication from the input of port 2 of the conference bridge CB1 to port 1 of conference bridge CB2. In the same manner, communication is inhibited from the input of port 1 of the conference bridge CB2, via enabled transfer contacts 18C-1, 18C-2, 18C-3 and 18C-4. Trunk TO, which has been associated with the subsidiary bus of link LSO and port 2 of conference bridge CB1, remains with the subsidiary bus but is connected now through crosspoints TO-01 to port 2 of conference bridge CB2. Trunk T1 which had been associated with the subsidiary communication link of LS9, however, remains associated with that link and therefore is cut off from the conference. The attendant must then reoperate key T1 on the console in order to connect trunk T1 back into the combined conference connection. This is accomplished in the same manner as previously set forth in subsection 2.061 for trunks T7 and T8. Trunk T1 is thereby connected through crosspoints TO-113 and the main communication bus of link 11 to port 4 of conference bridge CB2.

The attendant at this time also operates the keys associated with stations S3, S4 and S5 in order to transfer those stations from link LS9 to link LSO for communication purposes. This transfer is accomplished as previously detailed in subsection 2.03 whereby the operation of each of the station keys S2, S4 and S5 cause the release of the corresponding hold magnet and the reselection of the new, in this case LSO, link and the subsequent reclosure of the crosspoints associated therewith.

Summarizing at this point, stations SO, S1, S2, S3, S4 and S5 are each connected to the same communication link for communication purposes in addition to being connected to talk-back amplifier TBO and to the attendant's console. Also connected to the talk-back amplifier TBO is main horizontal bus 1301, which terminates in port 1 of conference bridge CB1. Port 2 of conference bridge CB1 is connected to port 1 of conference bridge CB2. Ports 3 and 4 of conference bridge CB1 are terminated to trunks T7 and T8, respectively, while port 2 of conference bridge CB2 is now connected to trunk TO. Ports 3 and 4 of conference bridge CB2 are connected, respectively, to trunks T17 and T1. Communication is therefore possible in the manner previously set forth among all the connected trunks and all the connected stations.

2.12 Communication Circuits Released

Upon the termination of a conference or at any other time when a party desires to leave the conference, the station merely goes on hook, thereby releasing relays 23LT and 23LR in the corresponding station circuit, such as LIO, FIG. 23. Release of these relays starts a timing interval after which relay 23RL operates, thereby removing the holding battery from the associated hold magnet via enabled break contact 23RL-2 over lead HB to line switch 0, FIG. 22. In the case of a trunk, release of signal relay 21E extends a ground from operated make contact 21A-5, FIG. 21, and released break contact 21E-6 to the 21RL relay, thereby enabling the release of the hold magnet associated with the connected trunk.

In the case of a conference bridge, such as conference bridge CB2, when all the trunks have been released from all legs of the bridge, all associated 7LG- relays, such as relays 7LG12, 7LG22, 7LG32 and 7LG42 are released in the manner set forth in subsection 2.06. Accordingly, a ground is extended, (FIG. 9) through released break contacts 7LG41-3 and 7LG31-3, enabled make contacts 11BC-2 and 11BC-3, released break contacts 7LG22-6, 7LG32-6, 7LG42-6 and operated make contacts 11BC-4, 11CM-1, 9CZ-5, 9CZ-4, 9CW-6 and 9CZ-2 to shunt relay 9CW. Relay 9CW releasing removes the operate path for relay 9CZ via released make contact 9CW-6. Relay 9CZ releasing transfers ground, via transfer contact 9CZ-5, diode BZ1, enabled make contact 9BZ1-4, released break contact 9CW-1 and enabled make contact 9BZ1-3 to shunt relay 9BW1. Similarly, ground is extended via diode BZ2, enabled make contact 9BZ2-4, released break contact 9CW-3 and enabled contact 9BZ2-2 to shunt relay 9BW2.

Accordingly, release of relays 9BW1 and 9BW2 cause grounds to be extended (FIG. 8) via enabled make contacts 9BZ1-2 and 9BZ2-2, respectively, to leads RLO and RL1 to FIGS. 14 and 18, thereby operating the respective 14RL and 18RL relays in an obvious manner which in turn release the hold magnets 13HO and 13H1. In similar manner, upon the release of all the legs of a noncombined bridge a ground is extended via the appropriate contacts (shown in FIG. 80-9) and the RLO or RL1 leads to the associated conference bridge circuit, thereby releasing the connection. At the same time, if necessary, ground is extended to the corresponding 9BW and 9BZ relays, thereby releasing any operated bridge connection relay.

2.13 Conclusion

While the equipments of this invention have been described with reference to a particular embodiment in an arrangement whereby conference bridge circuits and associated switch fields are shown as being associated with trunk circuits and line circuits via direct lines or via a direct telephone system, it is to be understood that such an embodiment is intended only to be illustrative of the present invention and that numerous other arrangements may be devised by those skilled in the art without departing from the spirit and scope of the invention.

For example, the invention may be employed as a conference switching arrangement in a radio switching system wherein all the circuits require individual conference bridge circuitry.

Another example would be where the invention is employed as an additional feature for a private branch exchange switchboard wherein the PBX lines have direct access to the conference switch fields.

Another example would be where it is desired to serially insert additional circuits, such as transmission monitoring equipment, into selected connections without the necessity of providing an additional switching network.

Another example would be where central computer or data processing equipment is arranged to transmit information to selected stations and it is desired to serially insert printout or monitoring equipment into the transmission path between the terminal equipments.

I claim:

1. In a communication system:
- link means;
- communication means;
- auxiliary communication means;
- means for connecting said communication means to said link means;
- means for connecting said auxiliary communication means to said link means; and
- means responsive to the concurrent connection of said communication means and said auxiliary communication means to said link means for serially inserting said auxiliary communication means between said communication means and said link means.

2. In a communication system:
- a link;
- a plurality of communication circuits;
- a plurality of auxiliary communication circuits;
- means for selectively connecting any of said communication circuits and any of said auxiliary communication circuits to said link; and
- means responsive to the concurrent connection of one of said communication circuits and one of said auxiliary communication circuits to said link for serially inserting said one auxiliary communication circuit between said one communication circuit and said link.

3. In a communication system, the combination set forth in claim 2 further comprising:
- selectively operable means for serially inserting said one auxiliary communication circuit between other of said communication circuits and said link.

4. A communication system comprising:
- a switch field comprising vertical columns and horizontal rows;
- a plurality of communication circuits each of which is exclusively associated with one of said vertical columns in a first group of said columns;
- a plurality of conference bridges each of which is exclusively associated with one of said vertical columns in a second group of said columns;
- an attendant position comprising selectively operable control means;
- switching means responsive to said selectively operable control means for enabling said switch field to connect any one of said horizontal rows to any one of said vertical columns;
- and means responsive to the concurrent connection of one of said horizontal rows with one vertical column in said first group and one vertical column in said second group for serially inserting the one conference bridge associated with the said vertical column in said second group between the communication circuit associated with said one vertical column in said first group and said one horizontal row.

5. A communication system as set forth in claim 4 further comprising means for serially inserting said one conference bridge between other said communication circuits and said horizontal row.

6. A communication system as set forth in claim 5 wherein each said conference bridge comprises echo suppression means exclusively associated with said one communication circuit and with each of said other communication circuits.

7. A communication system as set forth in claim 6 wherein certain of said communication circuits comprise means operative upon association with said conference bridge for inhibiting the said echo suppression means exclusively associated therewith.

8. A communication system as set forth in claim 7 wherein said switching means further comprises: means controlled by said selectively operable means for associating and disassociating said attendant position from said enabled transmission path.

9. In a telephone system:
- a plurality of trunk circuits;
- a plurality of line circuits;
- a plurality of bridge circuits, each having a plurality of terminals;
- a communication link comprising a main and a subsidiary bus;
- selectively operable means for connecting certain of said line circuits and one of said trunk circuits to the main bus of said communication link;
- means for selectively connecting one of said bridge circuits via a first said terminal to said main bus and via a second said terminal to said subsidiary bus; and and
- means jointly responsive to the connection of one of said bridge circuits and one of said trunk circuits to said main bus for transferring the connection of said one trunk circuit from said main bus to said subsidiary bus.

10. In a telephone system, the combination set forth in claim 9 further comprising means for connecting other of said trunk circuits to other of said terminals of said bridge circuit.

11. In a telephone system, the combination set forth in claim 10 wherein said bridge circuit comprises echo suppression means associated with at least one of said terminals.

12. In a telephone system, the combination set forth in claim 11 wherein each said trunk circuit comprises means operative upon connection to any said terminal for inhibiting the said echo suppression means associated with said any terminal.

13. In a telephone system, the combination set forth in claim 9 further comprising: means operative in response to the connection of one of said trunk circuits to said one main bus of said communication link for preventing the connection of any other of said trunk circuits to said one main bus.

14. A conference system comprising:
- a plurality of line circuits each of which includes a two conductor receive input and a two conductor transmit output;
- a plurality of trunk circuits each of which includes a two conductor receive input and a two conductor transmit output;
- a plurality of bridge circuits each having a plurality of terminals;
- a communication link comprising a main and a subsidiary bus;
- selectively operable means for connecting certain of said line circuits and one of said trunk circuits to the main bus of said communication link;
- amplifier means for enabling transmission from the two conductor transmit outputs of all of said connected lines to the two conductor receive inputs of all the connected line circuits and to the two conductor receive input of the connected trunk circuit;
- means for selectively connecting one of said bridge circuits via a first terminal to said main bus and via a second terminal to said subsidiary bus;
- means responsive to the concurrent connection of one of said bridge circuits and one of said trunk circuits to the communication link for transferring the connection of said one trunk circuit from said main bus to said subsidiary bus; and
- switch means including said amplifier means for enabling transmission from the two conductor transmit output of said one trunk circuit via said subsidiary bus to the second terminal of said bridge circuit and from the first terminal of said bridge circuit via said main bus to the two conductor receive inputs of all the connected line circuits.

15. A conference system as set forth in claim 14 further comprising: means for connecting other of said trunk circuits to other of said terminals of said bridge circuit.

16. A conference system as set forth in claim 15 wherein said switch means further includes: means for enabling transmission from the two conductor transmit output of one of said other connected trunk circuits via said bridge circuit to the two conductor receive inputs of all the other connected line and trunk circuits.

17. In a conference system in accordance with claim 15 wherein:

each of said terminals of said bridge circuit is operative to insert means for the suppression of echoes on each of said connected trunk circuits; and means in each of said terminals of said bridge circuit operative upon the connection of certain selected ones of said trunk circuits for inhibiting said echo suppression means.

18. In a telephone system:

a plurality of multiple terminal trunk circuits:

a plurality of links each link comprising a main and a subsidiary communication bus;

a plurality of conference bridges;

means for selectively enabling direct transmission between a first terminal of any one of said trunk circuits and the main communication bus of any one of said links:

means for selectively connecting any one of said conference bridges to the main communication bus of any one of said links:

means responsive to the connection of a conference bridge to an enabled main communication bus for serially inserting said conference bridge into a transmission path between said main communication bus and a second terminal of said trunk circuit; and means concurrently responsive with said serial insertion of said conference bridge for inhibiting said enabled direct transmission path and for enabling transmission between said main bus and said second terminal of said trunk circuit.

19. In a telephone system, the combination set forth in claim 18 wherein:

certain of said links are arranged as auxiliary links;

means for selectively connecting any of said trunk circuits to any of said auxiliary links;

means responsive to the connection of one of said trunk circuits with one of said auxiliary links for enabling transmission between said one trunk circuit and said subsidiary communication bus of said one auxiliary link; and means responsive to the concurrent connection of another of said trunk circuits to said one auxiliary link for enabling transmission between said another trunk circuit and said main communication bus of said one auxiliary link.

20. A communication system comprising:

selectively operable control means;

a plurality of trunk circuits;

a plurality of communication links;

a plurality of conference bridge circuits; and switch means responsive to the concurrent connection of one of said trunk circuits selected by said selectively operable control means and one of said conference bridge circuits selected by said selectively operable control means to a selected one of said communication links for selectively inserting said one conference bridge between each said selected communication link to establish a conference of said trunk circuits.

21. A communication system in accordance with claim 20 wherein:

said switch means is further operable in response to said selectively operable means for serially inserting another one of said bridge circuits between other selected ones of said trunk circuits and another selected one of said communication links to establish a second conference of said trunk circuits; and means operable in response to said selectively operable means for interconnecting said established conferences of trunk circuits.